(12) United States Patent
Berezin et al.

(10) Patent No.: US 9,274,008 B2
(45) Date of Patent: Mar. 1, 2016

(54) NANOTHERMOMETER, METHODS AND USES THEREFOR

(71) Applicant: Washington University, Saint Louis, MO (US)

(72) Inventors: Mikhail Y Berezin, Saint Louis, MO (US); Tiffany P Gustafson, College Station, TX (US)

(73) Assignee: Washington University, Saint Louis, MO (US)

(*) Notice: Subject to any disclaimer, the term of this patent is extended or adjusted under 35 U.S.C. 154(b) by 0 days.

(21) Appl. No.: 14/091,948

(22) Filed: Nov. 27, 2013

(65) Prior Publication Data
US 2014/0147929 A1 May 29, 2014

Related U.S. Application Data

(60) Provisional application No. 61/730,881, filed on Nov. 28, 2012.

(51) Int. Cl.
*G01N 21/76* (2006.01)
*G01K 11/20* (2006.01)

(52) U.S. Cl.
CPC ............ *G01K 11/20* (2013.01); *G01K 2211/00* (2013.01)

(58) Field of Classification Search
USPC ........................................................ 436/172
See application file for complete search history.

(56) References Cited

U.S. PATENT DOCUMENTS

| 7,291,299 | B2 | 11/2007 | Bando et al. |
| 7,331,709 | B2 | 2/2008 | Bando et al. |
| 2010/0136341 | A1 | 6/2010 | Kirkor et al. |
| 2012/0183012 | A1 | 7/2012 | Palacio et al. |

OTHER PUBLICATIONS

Drake et al. (Journal of Analytical Chemistry, 2010, vol. 65 No. 6 pp. 608-613).*
Oliveira et al. (Inorg. Chem. 2011, 50, 8797-8807).*
Berezin, M. Y., Achilefu, S. Fluorescence lifetime measurements and biological imaging. Chem. Rev. 2010, 110, 2641-84.
Benninger, R. K., Koc, Y., Hofmann, O., Requejo-Isidro, J., Neil, M. A., French, P. M., Demello, A. J. Quantitative 3D mapping of fluidic temperatures within microchannel networks using fluorescence lifetime imaging. Anal. Chem. 2006, 78, 2272-8.
Bhatt, N., Huang, P. J., Dave, N., Liu, J. Dissociation and degradation of thiol-modified DNA on gold nanoparticles in aqueous and organic solvents. Langmuir 2011, 27, 6132-7.
Black, K. C., Kirkpatrick, N. D., Troutman, T. S., Xu, L., Vagner, J., Gillies, R. J., et al. Gold nanorods targeted to delta opioid receptor: plasmon-resonant contrast and photothermal agents. Mol. Imaging 2008, 7, 50-7.
Cardinal, J., Klune, J.R., Chory, E., Jeyabalan, G., Kanzius, J.S., Nalesnik, M., Geller, D.A. Non-Invasive Radiofrequency Ablation of Cancer Targeted by Gold Nanoparticles. Surgery. Aug. 2008; 144(2): 125-132.
Chen, Y. S., Frey, W., Kim, S., Kruizinga, P., Homan, K., Emelianov, S. Silica-coated gold nanorods as photoacoustic signal nanoamplifiers. Nano Lett. 2011, 11, 348-54.
Gao, J., Huang, X., Liu, H., Zan, F., Ren, J. Colloidal stability of gold nanoparticles modified with thiol compounds: bioconjugation and application in cancer cell imaging. Langmuir. Mar. 6, 2012;28(9):4464-71. Epub Feb. 24, 2012.
Gupta, A., Kane, R.S., and Borca-Tasciuc, D.A. Local temperature measurement in the vicinity of electromagnetically heated magnetite and gold nanoparticles. J. Appl. Phys. 2010, 108, 064901.
Gustafson, T.P., Cao, Q., Wang, S.T., Berezin, M.Y. Design of irreversible optical nanothermometers for thermal ablations. Chem Commun (Camb). Jan. 25, 2013;49(7):680-2.
Hirsch, L. R., Stafford, R. J., Bankson, J. A., Sershen, S. R., Rivera, B., Price, R. E., Hazle, J. D., Halas, N. J., West, J. L. Nanoshell-mediated near-infrared thermal therapy of tumors under magnetic resonance guidance. Proc. Natl. Acad. Sci. USA 2003, 100, 13549-54.
Hsia, C.H., Wuttig, A., Yang, H. An Accessible Approach to Preparing Water-Soluble Mn2+-Doped (CdSSe)ZnS(Core)Shell Nanocrystals for Ratiometric Temperature Sensing. ACS Nano 2011, 5, 9511-9522.
Huang, X., Jain, P. K., El-Sayed, I. H., El-Sayed, M. A. Gold nanoparticles: interesting optical properties and recent applications in cancer diagnostics and therapy. Nanomedicine (Lond). Oct. 2007;2(5):681-93.
Ishizaka, H., Shiraishi, A., Awata, S., Shimizu, A., Hirasawa, S. Short communication. Development of a fine thermocouple-needle system for real-time feedback of thermal tumour ablation margin. Br. J. Radiol. 2011, 84, 1139-41.
Jain, P. K., Lee, K. S., El-Sayed, I. H., El-Sayed, M. A. Calculated absorption and scattering properties of gold nanoparticles of different size, shape, and composition: applications in biological imaging and biomedicine. J. Phys. Chem. B, 2006, 110, 7238-48.
Jaque, D., Vetrone, F. Luminescence nanothermometry. Nanoscale 2012, 4, 4301-4326.

(Continued)

*Primary Examiner* — James H Alstrum Acevedo
*Assistant Examiner* — Tara Martinez
(74) *Attorney, Agent, or Firm* — Zackson Law LLC; Saul L. Zackson

(57) ABSTRACT

A nanothermometer is disclosed. In various embodiments, a nanothermometer comprises a nanoparticle such as a gold nanoparticle, a fluorophore, and a linker, such as a peptide linker, extending between the nanoparticle and the fluorophore, whereby the fluorophore is self-quenched. The linker can comprise one or more cysteines. An unheated thermometer shows little or no fluorescence. Upon heating, fluorophore-linker conjugates are released from the nanoparticle, thereby unquenching the fluorescence. An increase in fluorescence results. In some embodiments, the increase in fluorescence can be irreversible. Methods of measuring temperature of a sample such as a biological sample, and methods of synthesizing a nanothermometer, are also disclosed. A molecular thermometer is also disclosed.

9 Claims, 25 Drawing Sheets

(56) References Cited

OTHER PUBLICATIONS

Lee, J., Govorov, A.O., Kotov, N. A. Nanoparticle Assemblies with Molecular Springs. Angew. Chem. Int. Ed. 2005, 44, 7439-7442.

Lee, J., Kotov, N. A. Thermometer design at the nanoscale. Nano Today 2007, 2, 48-51.

Lencioni, R. A., Allgaier, H. P., Cioni, D., Olschewski, M., Deibert, P., Crocetti, L., et al. Small hepatocellular carcinoma in cirrhosis: randomized comparison of radio-frequency thermal ablation versus percutaneous ethanol injection. Radiology 2003, 228, 235-40.

Leveillee, R. J., Castle, S. M., Salas, N., Doshi, M., Gorbatiy, V., O'Neill, W. Improved targeting of radio-frequency ablation probes and thermal sensors: a preliminary investigation of flat-panel CT-guided ablation of renal tumors performed in the cardiac catheterization laboratory. J. Endourol. 2011, 25, 1119-23.

Maestro, L.M., Haro-Gonzalez, P., Coello, J.G., Jaque, D. Absorption efficiency of gold nanorods determined by quantum dot fluorescence thermometry. Applied Physics Letters 2012, 100, 201110.

Mctaggart, R. A.; Dupuy, D. E. Thermal Ablation of Lung Tumors. Tech. Vasc. Interv. Radiol. 2007, 10, 102-113.

Melancon, M. P., Zhou, M., Li, C. Cancer theranostics with near-infrared light-activatable multimodal nanoparticles. Acc. Chem. Res. 2011, 44, 947-56.

Moran, C. H., Wainerdi, S. M., Cherukuri, T. K., Kittrell, C., Wiley, B. J., Nicholas, N. W., et al. Size-Dependent Joule Heating of Gold Nanoparticles Using Capacitively Coupled Radiofrequency Fields. Nano Res. 2009, 2, 400-405.

Pattani, V.P., Tunnell, J.W. Nanoparticle-mediated photothermal therapy: a comparative study of heating for different particle types. Lasers Surg Med. Oct. 2012;44(8):675-84. Epub Aug. 29, 2012.

Prevenslik, T.V. QED Radiations. Nano-thermometers by Quantum Mechanics. 2011. Accessed Dec. 3, 2013. http://www.nanoqed.org/resources/2011/Thermometer.pdf.

Richardson, H. H., Carlson, M. T., Tandler, P. J., Hernandez, P., Govorov, A. O. Experimental and Theoretical Studies of Light-to-Heat Conversion and Collective Heating Effects in Metal Nanoparticle Solutions. Nano Lett. 2009, 9, 1139-1146.

Schade, M., Moretto, A., Donaldson, P.M., Toniolo, C., Hamm, P. Vibrational Energy Transport through a Capping Layer of Appropriately Designed Peptide Helices over Gold Nanoparticles. Nano Lett. Aug. 11, 2010;10 (8):3057-61.

Stafford, R. J., Shetty, A., Elliott, A. M., Schwartz, J. A., Goodrich, G. P., Hazle, J. D. MR temperature imaging of nanoshell mediated laser ablation. Int J Hyperthermia. 2011;27(8):782-90.

Schwartzberg, A. M., Zhang, J. Z. Novel Optical Properties and Emerging Applications of Metal Nanostructures. J. Phys.Chem. C, 2008, 112, 10323-10337.

Gustafson, T. P., Metzel, G. A., Kuteladze, A. G. Photochemically amplified detection of molecular recognition events: an ultra-sensitive fluorescence turn-off binding assay. Org. Biomol. Chem. 2011, 9, 4752-5.

Tong, L., Wei, Q., Wei, A., Cheng, J. X. Gold nanorods as contrast agents for biological imaging: optical properties, surface conjugation and photothermal effects. Photochem. Photobiol. 2009, 85, 21-32.

Vetrone, F., Naccache, R., Zamarron, A., Juarranz De La Fuente, A., Sanz-Rodriguez, F., Martinez Maestro, L., et al. Temperature Sensing Using Fluorescent Nanothermometers. ACS Nano 2010, 4, 3254-3258.

Vyalikh, A., Wolter, A.U., Hampel, S., Haase, D., Ritschel, M., Leonhardt, A., et al. A carbon-wrapped nanoscaled thermometer for temperature control in biological environments. Nanomedicine 2008, 3(3), 321-327.

Zandberg, W. F., Bakhtiari, A. B., Erno, Z., Hsiao, D., Gates, B. D., Claydon, T., Branda, N. R. Photothermal release of small molecules from gold nanoparticles in live cells. Nanomedicine. Aug. 2012;8(6):908-15.

Zhegalova, N. G., Aydt, A., Wang, S.T., Berezin, M.Y. Molecular thermometers for potential applications in thermal ablation procedures. Reporters, Markers, Dyes, Nanoparticles, and Molecular Probes for Biomedical Applications V. 2013. Proceedings of the SPIE, vol. 8596, id. 859601 9 pp.

\* cited by examiner

NANOTHERMOMETER, METHODS AND USES THEREFOR

PRIORITY

This application claims the benefit of priority to U.S. Provisional patent application 61/730,881 filed Nov. 28, 2012. This application is incorporated by reference in its entirety.

GOVERNMENT SUPPORT

This work received support from NIH/NCI grant R21CA149814. The government may have certain rights in the invention.

INTRODUCTION

Clinical thermometry of the human body is one of the most fundamental and successful techniques in healthcare. Temperature measurements on a sub-millimeter scale remain a significant challenge (Lee. J., et al. *Angew. Chem. Int. Ed. Engl.* 44: 7439-42, 2005; Lee, J. and Kotov, N. A., *Nano Today* 2: 48-51, 2007; Jaque, D. and Vetrone, F., *Nanoscale.* 4: 4301-26, 2012; Vetrone, F., et al., *ACS Nano.* 4: 3254-8, 2010; Hsia, C. H., et al., *ACS Nano.* 5: 9511-22, 2011). The problem becomes especially apparent in thermal medical treatments such as tumor ablation when precise monitoring of temperature to minimize the damaging effects on healthy tissue is essential for the efficacy and safety of these procedures. For example, during the course of a thermal treatment, the temperature of target cells is typically raised to at least 43° C. to trigger protein denaturation. However, during a thermal treatment, the treatment provider typically desires to keep the target tumor temperature below 95° C. in order to avoid boiling and charring of cells and tissue. For some applications such as thermal treatment of cancer, ideal temperature can be within the range of 60-80° C., at which tumor cells rapidly die (Melancon, M. P., et al., *Acc. Chem. Res.* 44: 947-56, 2011; Stafford, R. J., et al., *Int. J. Hyperther.* 27: 782-90, 2011; Ishizaka, H., et al., *Br. J. Radiol.* 84: 1139-41, 2011; Leveillee, R. J., et al., *J. Endourol.* 25: 1119-23, 2011).

Cardinal et al. describe the use of gold nanoparticles to destroy tissue thermally (Cardinal, J., et al., *Surgery* 144: 125-32, 2008). This study involved the use of a fiber-optic thermometer to collect temperature data during treatment and not the nanoparticle itself as a temperature gauge.

Nanoscale devices and methods for measuring and reporting temperatures, such as, for example, during a therapeutic thermal ablation, are thus needed.

SUMMARY

The present inventors have developed nanothermometers. A nanothermometer of the present teachings includes a non- or minimally-fluorescent nanoparticle which can exhibit an increase in fluorescence when the temperature of its environment reaches a critical temperature. In various configurations, the increase in fluorescence can be irreversible, i.e., following exposure to a critical (or greater) temperature which leads to an increase in fluorescence, a nanothermometer of these configurations does not decrease its fluorescence back to its original (i.e., pre-heated) level when temperature is reduced below the critical temperature. In various embodiments, irreversibility of fluorescence activation of a nanothermometer of the present teachings can be useful for highlighting treated regions and avoiding repetition of treatment over the same area.

In various embodiments, a nanothermometer of the present teachings can comprise a) a nanoparticle core such as a gold nanorod core, b) a linker that is bound to the nanoparticle in a temperature-sensitive manner, and c) a fluorescent dye bound to the linker. The fluorescent dye can be subject to self-quenching, whereby prior to heating to a critical temperature (or greater), the nanothermometer can be weakly or non-fluorescent. A fluorescent dye of the present teachings can be any organic fluorescent molecule that can self-quench. Without being limited by theory, it is believed that prior to heating, a nanothermometer of these embodiments comprises the fluorophore in sufficient concentration on the nanoparticle surface so as to self-quench fluorescence. However, upon heating, the linker (with fluorophore attached) is released from the nanoparticle, thereby unquenching fluorescence of the fluorophore. Fluorescence intensity thereby increases, providing a detectable signal indicative of temperature. Without being limited by theory, the increase in fluorescence can be an increase in fluorescence of the particles themselves due to release from the surface of the nanoparticle of sufficient amounts of linker-fluorophores to unquench remaining fluorophores, unquenching of fluorophores released from the nanoparticle surface into solution, or a combination thereof.

In some embodiments, a nanothermometer of the present teachings can comprise a) a nanoparticle core such as a gold nanorod core, b) a linker that is bound to the nanoparticle core in a temperature-sensitive manner, c) a fluorescent dye bound to the first linker, and d) a fluorescence quencher bound to the nanoparticle. In some embodiments, a nanothermometer of the present teachings can comprise a) a nanoparticle core such as a gold nanorod core, b) a first linker that is bound to the gold nanorod c) a fluorescent dye bound to the first linker, d) a second linker that is bound to the gold nanorod core, and e) a fluorescence quencher bound to the second linker. In these embodiments, the fluorescence quencher quenches the fluorescence of the fluorophore when both fluorophore and quencher are bound (directly or indirectly) to the nanoparticle. However, upon heating, fluorophore and/or quencher can be released from the particle surface, thereby leading to an increase in fluorescence. In these embodiments, the nanoparticle can be non- or weakly fluorescent prior to heating. Upon heating to the critical temperature (or greater), fluorescence of the nanoparticle and/or its surrounding medium increases.

In various configurations, a nanothermometer of the present teachings can have minimal fluorescence due to quenching of a fluorophore, either through self-quenching or presence of a quencher at temperatures below 40° C., below about 40° C., below 45° C. below about 45° C., below 50° C., below about 50° C., below 55° C. or below about 55° C. In various configurations, a nanothermometer of the present teachings can exhibit an increase in fluorescence above 50° C., above about 50° C., above 55° C., above about 55° C., above 60° C., above about 60° C., above 65° C., above about 65° C., above 70° C., above about 70° C., above 75° C., above about 75° C., above 80° C., above about 80° C., above 85° C., or above about 85° C. In various embodiments, a nanothermometer of the present teachings, starting from a non- or minimally-fluorescent (i.e., quenched) state, can reach a maximally fluorescent state following continuous exposure to its critical temperature (or greater) within about 1000 seconds, within about 900 seconds, within about 800 seconds, within about 700 seconds, within about 600 seconds, within about 500 seconds, within about 400 seconds, within about 300 seconds, within about 200 seconds, or within about 100 seconds.

In various embodiments, a linker can include sulfhydryls. In various embodiments, a linker can be a peptide that includes one or more sulfhydryls, such as a cysteine-rich peptide. A peptide linker of the present teachings can comprise 1, 2, 3, 4, 5, 6, 7, 8, 9, 10 or more cysteine residues. In various configurations, a peptide linker can consist of 1, 2, 3, 4, 5, 6, 7, 8, 9, 10, or more total amino acid residues. In some configurations, a linker can comprise one or more amino acid residues that can provide flexibility to the peptide. In some configurations, a linker can further comprise one or more amino acids such as, without limitation, one or more glycine residues. In various configurations, a linker-fluorophore can be a covalent conjugate between a fluorescent dye and a cysteine rich peptide, such as, for example, a conjugate of a cysteine rich peptide and a fluorescent coumarin dye such as 7-diethylaminocoumarin-3-carboxylic acid. In various configurations, prior to synthesis of a linker-fluorophore of a nanothermometer of the present teachings, a linker peptide can comprise at least one primary amine which can be available for conjugation with a fluorophore comprising an amine-reactive moiety. In various configurations, such amine-reactive moieties can be, for example, an isocyanate, an isothiocyanate, a succinimidyl ester, a sulfosuccinimidyl ester, a tetrafluorophenyl (TFP) ester, a sulfodichlorophenol (SDP) ester, a carbonyl azide, a sulfonyl chloride, an acid halide, a carboxylic acid, so that a linker-fluorophore combination can be, for example and without limitation, a product of a reaction between a peptide such as a cysteine-rich peptide and an isothiocyanate moiety (e.g., fluorescein isothiocyanate). In other non-limiting examples, a linker-fluorophore combination can be the reaction product of a peptide such as a cysteine-rich peptide comprising a primary amine and a fluorophore comprising a succinimidyl ester moiety (e.g., NHS-Rhodamine). In other non-limiting examples, a linker-fluorophore combination can be the reaction product of a peptide such as a cysteine-rich peptide comprising a primary amine and a carboxylic acid dye, which can be conjugated using a carbodiimide such as 1-Ethyl-3-(3-dimethylamino-propyl)carbodiimide (EDAC).

In various embodiments, a nanothermometer of the present teachings can be used to measure temperature of a sample such as a biological sample, such as, without limitation, a tumor being subjected to therapeutic thermal ablation. In various configurations of these embodiments, a nanothermometer of the present teachings can be used to monitor tumor temperature in "real time," such that, for example, a treatment provider (e.g., an oncologist) can more precisely determine the temperature of a tumor while performing a thermal ablation therapy procedure on a subject comprising a tumor.

In various embodiments, upon reaching the critical temperature, dye fluorescence of a thermometer of the present teaching increases. Furthermore, the increase in fluorescence can be irreversible. The change in fluorescence can be observed and/or recorded by means well known to skilled artisans, such as, for example and without limitation, through use of a fluorescence detection device or system such as a CCD camera or a fluorometer.

In various embodiments, a nanothermometer of the present teachings can be synthesized using methods well known to skilled artisans. For example and without limitation, a nanothermometer comprising a gold nanorod core can be prepared using methods adapted from established procedures, such as a seed-mediated synthesis in the presence of cetyl trimethyl ammonium bromide (CTAB).

In various embodiments, a nanothermometer or molecular thermometer of the present teachings can include a second, non-self-quenching fluorophore or a non-quenched fluorophore as a reference fluorophore. In various configurations, a reference fluorophore can be used to quantify nanothermometers, or can serve provide a reference fluorescence signal, the intensity of which can be compared against that of an initially quenched fluorophore. In various configurations, the reference fluorophore can be bound to a nanoparticle through a linker such as a peptide linker. In various configurations, the fluorophores of these nanothermometers can have different excitation and/or different emission profiles, so that fluorescence signals from the fluorophores can be distinguished. In some embodiments, a nanoparticle can include a conjugate of a quenching fluorophore and a reference fluorophore. For example and without limitation, in some configurations can be a reference fluorophore can be a rhodamine or a coumarin.

The present teachings include the following non-limiting aspects.

1. A nanothermometer comprising:
   a nanoparticle;
   a fluorophore; and
   a linker extending between the nanoparticle and the fluorophore, whereby the fluorophore is self-quenched.

2. A nanothermometer of aspect 1, wherein the nanoparticle is a gold nanoparticle.

3. A nanothermometer of aspect 1, wherein the fluorophore is an organic fluorophore.

4A. A nanothermometer of aspect 1, wherein the fluorophore is an organic fluorophore selected from the group consisting of a fluorescein, a rhodamine (such as tetramethylrhodamine (TAMRA™) (NHS ester), RHODAMINE RED™-X

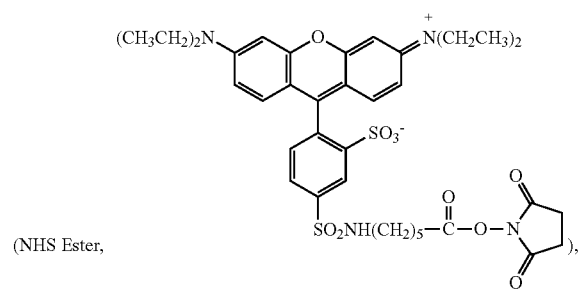

(NHS Ester,

RHODAMINE GREEN™ (Carboxyrhodamine 110), ROX™ (glycine conjugate of 5-carboxy-X-rhodamine, succinimidyl ester, NHS Ester), an ATTO™ dye such as ATTO™ 488

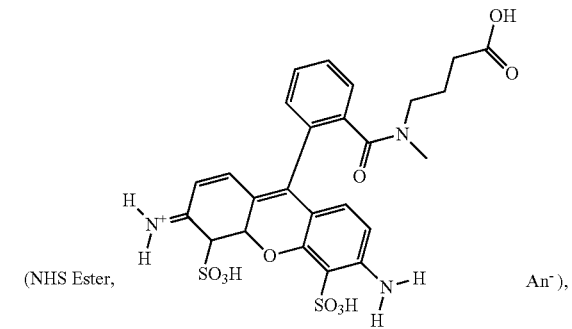 [SMILES: CN(CCCC(=O)O)C(=O)c1ccccc1C1=C2C=CC(=[NH2+])C(S(=O)(=O)O)C2Oc2c1ccc(N)c2S(=O)(=O)O]

(NHS Ester,

ATTO™ 532

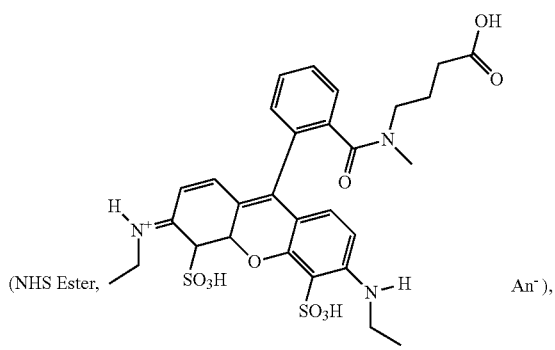 [SMILES: CCNc1ccc2c(c1S(=O)(=O)O)OC1C(=C2c2ccccc2C(=O)N(C)CCCC(=O)O)C=C/C(=[NH+]/CC)C1S(=O)(=O)O]

(NHS Ester, An⁻),

ATTO™ 550 (NHS Ester, novel fluorescent label related to the well-known dyes Rhodamine 6G and Rhodamine B), ATTO™ 565

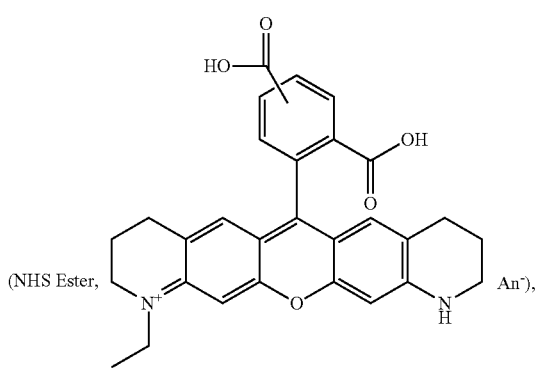

(NHS Ester, An⁻),

ATTO™ 590

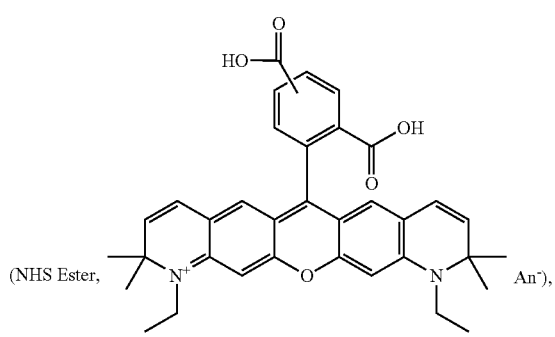

(NHS Ester, An⁻),

ATTO™ 633 (NHS Ester, cationic fluorescent dye for the red spectral region), ATTO™ 647N (NHS Ester, fluorescent dye for the red spectral region), ATTO™ Rho101 (NHS Ester, a derivative of the well-known dye Rhodamine 101), an ALEXA FLUOR® (Life Technologies) such as ALEXA FLUOR® 488 (

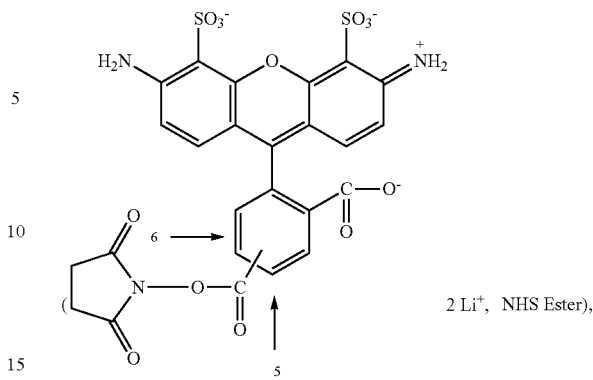

(2 Li⁺, NHS Ester),

NHS Ester), ALEXA FLUOR® 532 (NHS Ester, 1H-Pyrano [3,2-f:5,6-f']diindole-10,12-disulfonic acid, 5-[4-[[(2,5-dioxo-1-pyrrolidinyl)oxy]carbonyl]phenyl]-2,3,7,8-tetrahydro-2,3,3,7,7,8-hexamethyl-271795-14-3). ALEXA FLUOR™ 546 (NHS Ester, (NHS Ester,

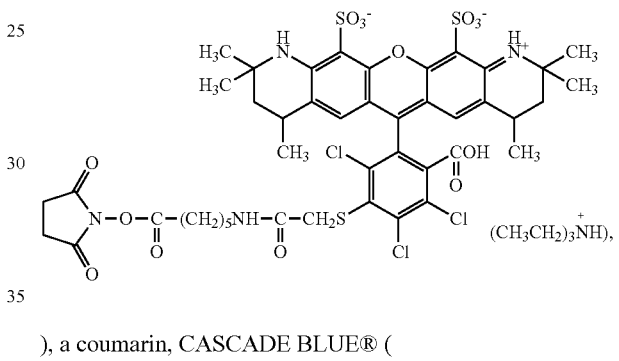

$(CH_3CH_2)_3NH$),

), a coumarin, CASCADE BLUE® (

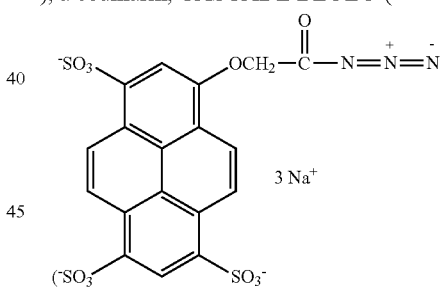

3 Na⁺

Life Technologies),

Life Technologies), a BODIPY® any of several fluorescent dyes comprising a core structure 4,4-difluoro-4-bora-3a,4a-diaza-s-indacene, Life Technologies), TEXAS RED® (

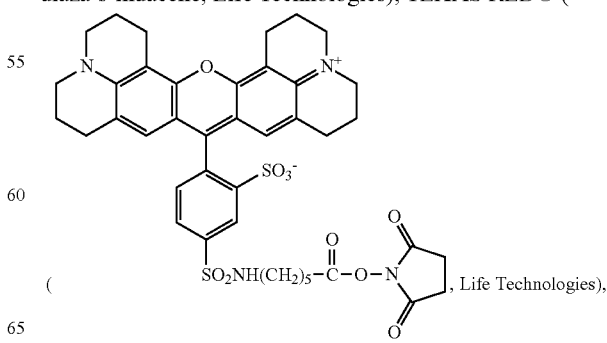

, Life Technologies),

Life Technologies). TEX™ 615 (NHS Ester, red flourescent dye, Integrated DNA technologies), HEX (Hexachlorofluorescein), IRDYE® 800CW (NHS Ester,

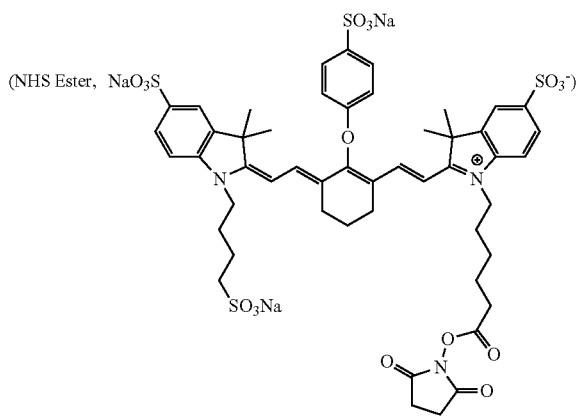

(LI-COR Biosciences), a MAX™ NHS ester (flourescent dye, excited with a 488 nm laser, Integrated DNA technologies) TYE™ 563 (bright flourescent dye, Integrated DNA technologies), ALEXA FLUOR® 594 (NHS Ester, Pyrano[3,2-g:5,6-g']diquinolin-13-ium, 6-[2-carboxy-4(or5)-[[(2,5-dioxo-1-pyrrolidinyl)oxy]carbonyl]phenyl]-1,2,10,11-tetrahydro-1,2,2,10,10,11-hexamethyl-4,8-bis(sulfomethyl)-), ALEXA FLUOR® 647 (NHS Ester, a bright and photostable far-red dye with excitation ideally suited to the 633 nm laser line), ALEXA FLUOR® 660 (NHS Ester, bright and photostable far-red dye with excitation ideally suited to the 633 or 647 nm laser line), TYE™ 665 (bright, fluorescent dye, Integrated DNA technologies), TYE™ 705 (bright, flourescent dye, Integrated DNA technologies), ALEXA FLUOR™ 750 (NHS Ester, bright and photostable near-IR dye). Lucifer Yellow, and an indocyanine (CY3™, CY5™, CY5.5™).

5. A nanothermometer of aspect 1, wherein the fluorophore is 7-diethylaminocoumarin-3-carboxylic acid.

6. A nanothermometer of aspect 1, wherein the linker comprises, consists essentially of, or consists of at least one amino acid.

7. A nanothermometer of aspect 1, wherein the linker is a peptide that comprises, consists essentially of, or consists of up to about 10 amino acids.

8. A nanothermometer of aspect 1, wherein the linker is a peptide which comprises at least one cysteine.

9. A nanothermometer of aspect 1, wherein the linker is a peptide consisting of up to about 10 amino acids of which from 1 up to about 10 are cysteines.

10. A nanothermometer of aspect 1, wherein the linker is a peptide consisting of up to about 10 amino acids and comprises from 2 up to about 8 cysteines.

11. A nanothermometer of aspect 1, wherein the linker is a peptide consisting of up to about 10 amino acids and comprises from 2 up to 7 cysteines.

12. A nanothermometer of aspect 1, wherein the linker is a peptide consisting of up to about 10 amino acids and comprises from 2 up to 6 cysteines.

13. A nanothermometer of aspect 1, wherein the linker is a peptide consisting of up to about 10 amino acids and comprises from 2 up to 5 cysteines.

14. A nanothermometer of aspect 1, wherein the linker is a peptide consisting of up to about 10 amino acids and comprises from 2 up to 4 cysteines.

15. A nanothermometer of aspect 1, wherein the linker is a peptide consisting of up to about 10 amino acids, and comprises 2-3 cysteines.

16. A nanothermometer of aspect 1, wherein the linker is a peptide consisting of no more than 10 amino acids, wherein the peptide comprises, consist essentially of, or consists of at least 1 cysteine up to 10 cysteines and at least one glycine.

17. A nanothermometer of aspect 1, wherein the linker is a peptide consisting of no more than about 10 amino acids, wherein the peptide comprises or consists of at least 2 cysteines up to 5 cysteines.

18. A nanothermometer of aspect 10, wherein the linker is a peptide consisting of no more than 10 amino acids, wherein the peptide comprises, consist essentially of, or consists of at least 2 cysteines up to 5 cysteines and at least one glycine.

19. A nanothermometer of aspect 10, wherein the linker is a peptide comprising, consisting essentially of, or consisting of the sequence selected from the group consisting of $NH_2$-Gly-Cys-Cys-Gly-$NH_2$(SEQ ID NO:1) and $NH_2$-Gly-Cys-Cys-Gly (SEQ ID NO:2).

20. A nanothermometer of aspect 1, having dimensions of about 50 nm×about 15 nm.

21. A nanothermometer of aspect 1, wherein the nanoparticle is a gold nanoparticle having dimensions of about 50 nm×about 15 nm, the fluorophore is 7-diethylaminocoumarin-3-carboxylic acid, and the linker is a cysteine-rich peptide.

22. A nanothermometer comprising:
   a nanoparticle;
   a fluorophore;
   a first linker extending between the nanoparticle and the fluorophore; and
   a fluorescence quencher.

23. A nanothermometer in accordance with aspect 22, further comprising a second linker extending between the nanoparticle and the fluorescence quencher.

24. A nanothermometer of aspect 22 or 23, wherein the nanoparticle is a gold nanoparticle.

25. A nanothermometer of aspect 22 or 23, wherein the fluorophore is an organic fluorophore.

26. A nanothermometer of aspect 22 or 23, wherein the fluorophore wherein the fluorophore is an organic fluorophore selected from the group consisting of a fluorescein, a rhodamine (such as tetramethylrhodamine (TAMRA™) (NHS ester), RHODAMINE RED™-X

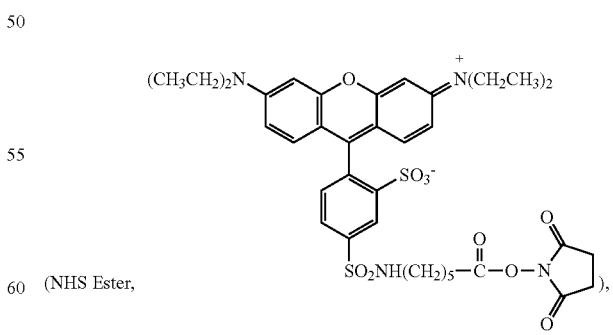

RHODAMINE GREEN™ (Carboxyrhodamine 110), ROX™ (glycine conjugate of 5-carboxy-X-rhodamine, succinimidyl ester, NHS Ester), an ATTO™ dye such as ATTO™ 488

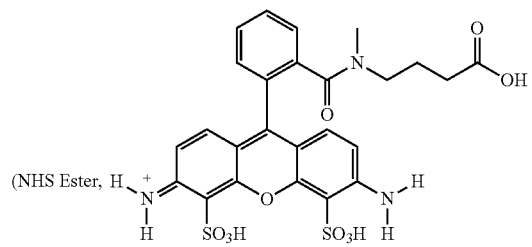

ATTO™ 532

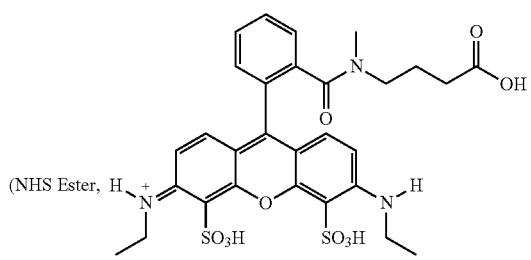

ATTO™ 550 (NHS Ester, novel fluorescent label related to the well-known dyes Rhodamine 6G and Rhodamine B), ATTO™ 565

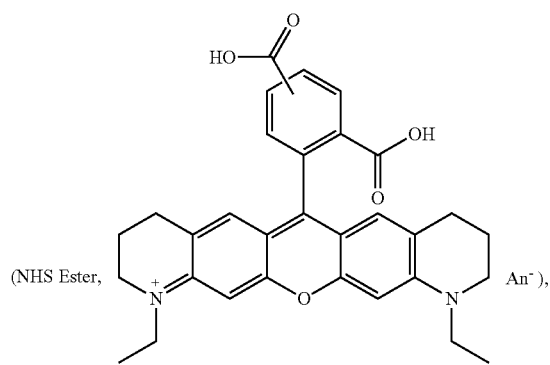

ATTO™ 590 (NHS Ester,

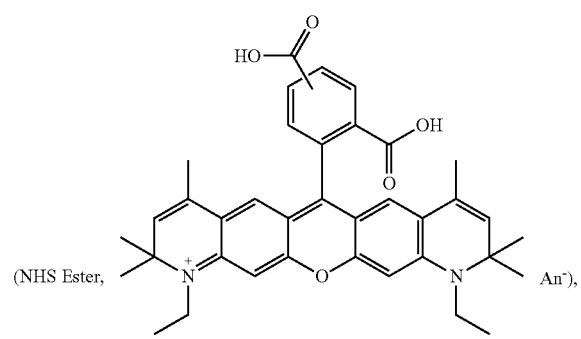

ATTO™ 633 (NHS Ester), ATTO™ 647N (NHS Ester, fluorescent dye for the red spectral region), ATTO™ Rho101. (NHS Ester, a derivative of the well-known dye Rhodamine 101), an ALEXA FLUOR® (Life Technologies) such as ALEXA FLUOR® 488

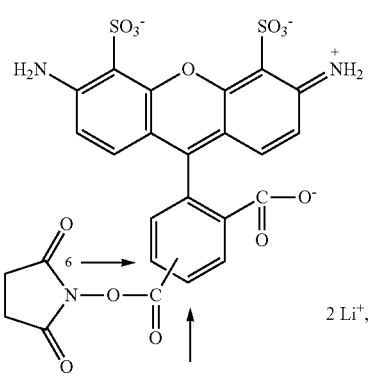

ALEXA FLOUR® 532 (NHS Ester, 1H-Pyrano[3,2-f:5,6-f'] diindole-10,12-disulfonic acid, 5-[4-[[(2,5-dioxo-1-pyrolidinyl)oxy]carbonyl]phenyl]-2,3,7,8-tetrahydro-2,3,3,7,7,8-hexamethyl-271795-14-3), ALEXA FLUOR® 546

(NHS Ester,

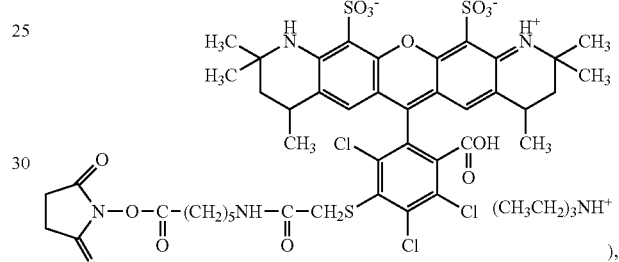

a coumarin, CASCADE BLUE®

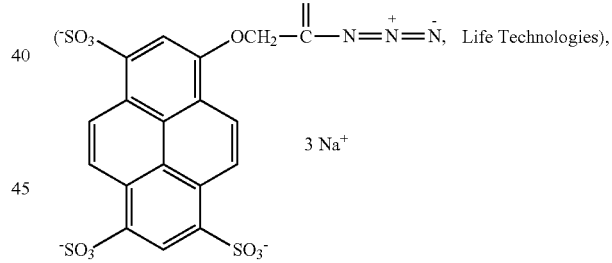

a BODIPY® (any of several fluorescent dyes comprising a core structure 4,4-difluoro-4-bora-3a,4a-diaza-s-indacene, Life Technologies), TEXAS RED®

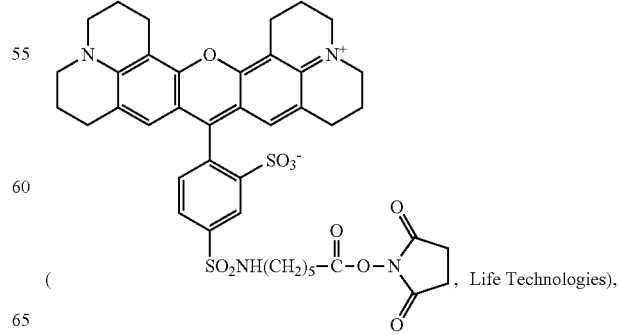

TEX™ 615 (NHS Ester, red flourescent dye, Integrated DNA technologies), HEX (Hexachlorofluorescein), IRDYE™ 800CW

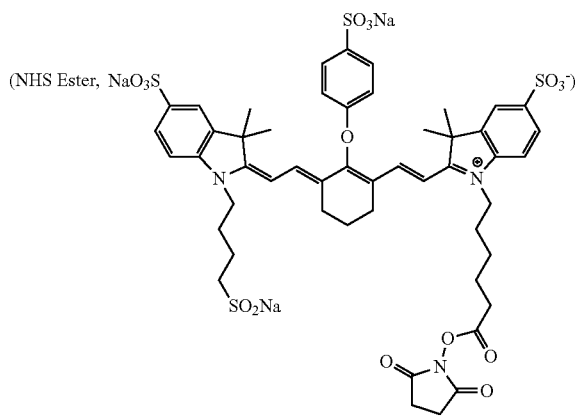

(LI-COR Biosciences), a MAX™ NHS ester (flourescent dye, excited with a 488 nm laser, Integrated DNA technologies) TYE™ 563 (bright flourescent dye, Integrated DNA technologies), ALEXA FLUOR® 594 (NHS Ester, Pyrano[3,2-g:5,6-g']diquinolin-13-ium, 6-[2-carboxy-4(or5)-[[(2,5-dioxo-1-pyrrolidinyl)oxy]carbonyl]phenyl]-1,2,10,11-tetrahydro-1,2,2,10,10,11-hexamethyl-4,8-bis(sulfomethyl)-), ALEXA FLUOR® 647 (NHS Ester a bright and photostable far-red dye with excitation ideally suited to the 633 nm laser line), ALEXA FLUOR® 660 (NHS Ester, bright and photostable far-red dye with excitation ideally suited to the 633 or 647 nm laser line), TYE™ 665 (bright, fluorescent dye. Integrated DNA technologies), TYE™ 705 (bright, flourescent dye, Integrated DNA technologies), ALEXA FLUOR™ 750 (NHS Ester, bright and photostable near-IR dye), Lucifer Yellow, and an indocyanine (CY3™, CY5™, CY5.5™).

27. A nanothermometer of aspect 22 or 23, wherein the fluorophore is a coumarin.

28. A nanothermometer of aspect 22 or 23, wherein the fluorophore is 7-diethylaminocoumarin-3-carboxylic acid.

29. A nanothermometer of aspect 22 or 23, wherein the first linker comprises, consists essentially of, or consists of at least one amino acid.

30. A nanothermometer of aspect 22 or 23, wherein the first linker is a peptide that comprises, consists essentially of, or consists of up to about 10 amino acids.

31. A nanothermometer of aspect 22 or 23, wherein the first linker is a peptide that comprises at least one cysteine.

32. A nanothermometer of aspect 22 or 23, wherein the first linker is a peptide consisting of up to about 10 amino acids and comprises from 1 up to about 10 cysteines.

33. A nanothermometer of aspect 22 or 23, wherein the first linker is a peptide consisting of up to about 10 amino acids and comprises from 2 up to about 8 cysteines.

34. A nanothermometer of aspect 22 or 23, wherein the first linker is a peptide consisting of up to about 10 amino acids and comprises from 2 up to 7 cysteines.

35. A nanothermometer of aspect 22 or 23, wherein the first linker is a peptide consisting of up to about 10 amino acids and comprises from 2 up to 6 cysteines.

36. A nanothermometer of aspect 22 or 23, wherein the first linker is a peptide consisting of up to about 10 amino acids and comprises from 2 up to 5 cysteines.

37 A nanothermometer of aspect 22 or 23, wherein the first linker is a peptide consisting of up to about 10 amino acids and comprises from 2 up to 4 cysteines.

38. A nanothermometer of aspect 22 or 23, wherein the first linker is a peptide consisting of up to about 10 amino acids and comprises 2-3 cysteines.

39. A nanothermometer of aspect 22 or 23, wherein the first linker is a peptide consisting of no more than 10 amino acids, wherein the peptide comprises, consist essentially of, or consists of at least 1 cysteine up to 10 cysteines and at least one glycine.

40. A nanothermometer of aspect 22 or 23, wherein the first linker is a peptide consisting of no more than about 10 amino acids, wherein the peptide comprises or consists of at least 2 cysteines up to 5 cysteines.

41. A nanothermometer of aspect 22, wherein the linker is a peptide comprising, consisting essentially of, or consisting of the sequence selected from the group consisting of NH$_2$-Gly-Cys-Cys-Gly-NH$_2$ (SEQ ID NO:1) and NH$_2$-Gly-Cys-Cys-Gly (SEQ ID NO:2).

42. A nanothermometer of aspect 23, wherein each linker is independently a peptide comprising, consisting essentially of, or consisting of the sequence selected from the group consisting of NH$_2$-Gly-Cys-Cys-Gly-NH$_2$ (SEQ ID NO:1) and NH$_2$-Gly-Cys-Cys-Gly (SEQ ID NO:2).

43. A nanothermometer of aspect 22 or 23, wherein the first linker is a peptide consisting of no more than 10 amino acids, wherein the peptide comprises, consist essentially of, or consists of at least 2 cysteines up to 5 cysteines and at least one glycine.

44. A nanothermometer of aspect 22 or 23, wherein the quencher is selected from the group consisting of QSY® 7 succinimidyl ester (Xanthylium, 9-(2-[[4-[[(2,5-dioxo-1-pyrrolidinyl)oxy)carbonyl)-1-piperidinyl]sulfonyl]phenyl]-3,6-bis(methrylphenylamino)-, chloride 304014-12-8, Life Technologies), QSY® 9 succinimidyl ester

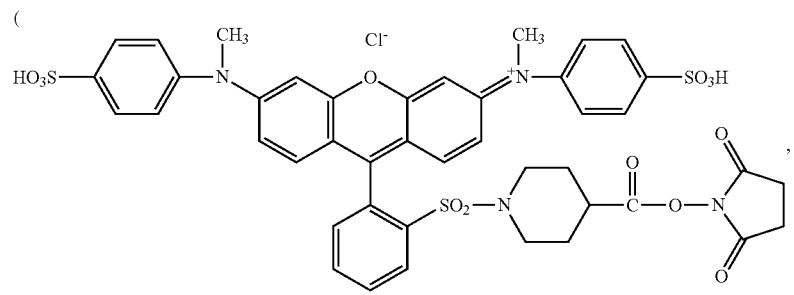

Life Technologies),

QSY® 21 succinimidyl ester

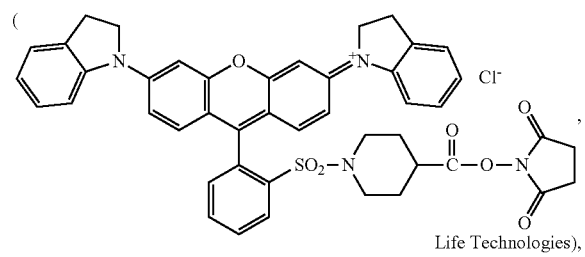 [SMILES: O=C(ON1C(=O)CCC1=O)C1CCN(S(=O)(=O)c2ccccc2-c2c3cc/c(=[N+]4/CCc5ccccc54)cc-3oc3cc(N4CCc5ccccc54)ccc23)CC1 ; [Cl-]]

(Life Technologies),

QSY® 35 acetic acid, succinimidyl ester

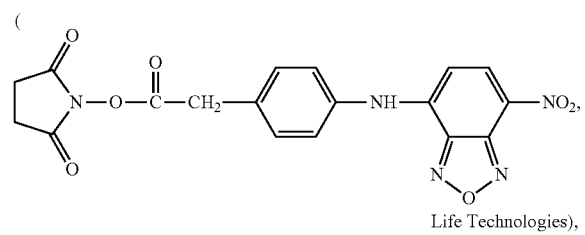

(Life Technologies),

DABCYL (4-((4-(dimethylamino)phenyl)azo)benzoic acid, succinimidyl ester), dinitrophenyl (DNP), DDQ-I (Eurogentec proprietary non-fluorescent molecule quenching lower wavelength dyes), DDQ-II (Eurogentec propreitary non-fluorescent quencher with an absorbance between 550-750 nm), ECLIPSE™ (4-N-methyl-N4'-nitro-2'-chloroazobenzen-4-yl)-aminobutanamido-1-(2-O-dimethoxytrityloxymethyl)-pyrrolidin-4-yl-succinoyl long chain alkylamino-CPG, Epoch Biosciences), IOWA BLACK® FQ (Quencher with absorbance spectra from 420-620 nm, Integrated DNA Technologies), BHQ-1

Biosearch Technologies).

45. A nanothermometer of aspect 23, wherein the second linker comprises, consists essentially of, or consists of at least one amino acid.
46. A nanothermometer of aspect 23, wherein the second linker is a peptide that comprises, consists essentially of, or consists of up to about 10 amino acids.
47. A nanothermometer of aspect 23, wherein the second linker is a peptide that comprises at least one cysteine.
48. A nanothermometer of aspect 23, wherein the second linker is a peptide consisting of up to about 10 amino acids and comprises from 1 up to about 10 cysteines.
49. A nanothermometer of aspect 23, wherein the second linker is a peptide consisting of up to about 10 amino acids and comprises from 2 up to about 8 cysteines.
50. A nanothermometer of aspect 23, wherein the second linker is a peptide consisting of up to about 10 amino acids and comprises from 2 up to 7 cysteines.
51. A nanothermometer of aspect 23, wherein the second linker is a peptide consisting of up to about 10 amino acids and comprises from 2 up to 6 cysteines.
52. A nanothermometer of aspect 23, wherein the second linker is a peptide consisting of up to about 10 amino acids and comprises from 2 up to 5 cysteines.
53. A nanothermometer of aspect 23, wherein the second linker is a peptide consisting of up to about 10 amino acids and comprises from 2 up to 4 cysteines.
54. A nanothermometer of aspect 23 wherein the second linker is a peptide consisting of up to about 10 amino acids and comprises 2-3 cysteines.
55. A nanothermometer of aspect 23, wherein the second linker is a peptide consisting of no more than 10 amino acids, wherein the peptide comprises, consist essentially of, or consists of at least 1 cysteine up to 10 cysteines and at least one glycine.
56. A nanothermometer of aspect 23, wherein the second linker is a peptide consisting of no more than about 10 amino acids, wherein the peptide comprises or consists of at least 2 cysteines up to 5 cysteines.

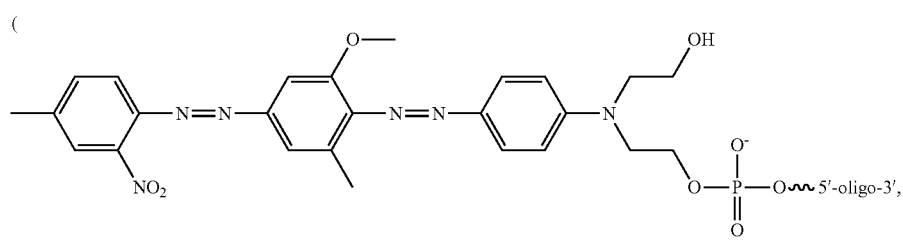

Biosearch Technologies) and BHIQ-3

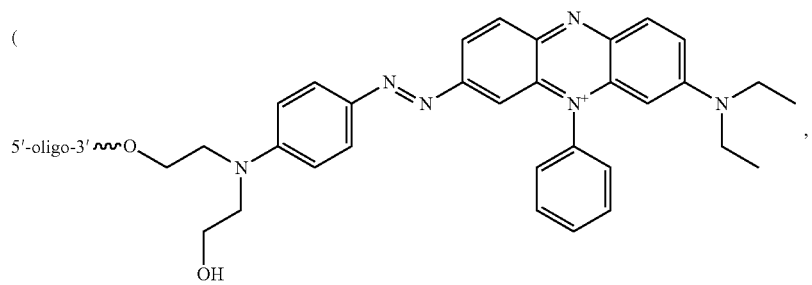

57. A nanothermometer of aspect 23, wherein the second linker is a peptide consisting of no more than 10 amino acids, wherein the peptide comprises, consist essentially of, or consists of at least 2 cysteines up to 5 cysteines and at least one glycine.

58. A nanothermometer of aspect 22 or 23, having dimensions of about 50 nm×about 15 nm.

59. A nanothermometer of aspect 22 or 23, wherein the nanoparticle is a gold nanoparticle having dimensions of about 50 nm×about 15 nm, the fluorophore is 7-diethylaminocoumarin-3-carboxylic acid, the first linker is a cysteine-rich peptide, and the quencher is a BHQ™ quencher selected from the group consisting of BHQ1

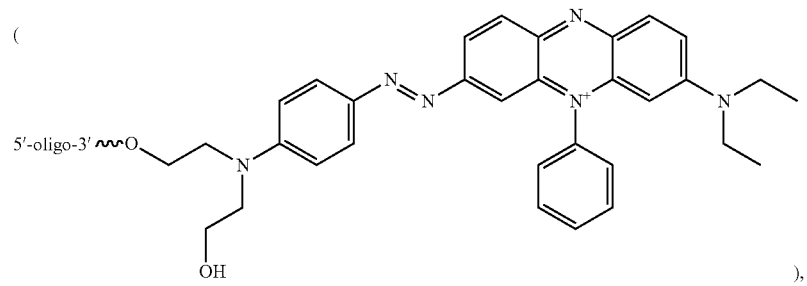

BHQ2

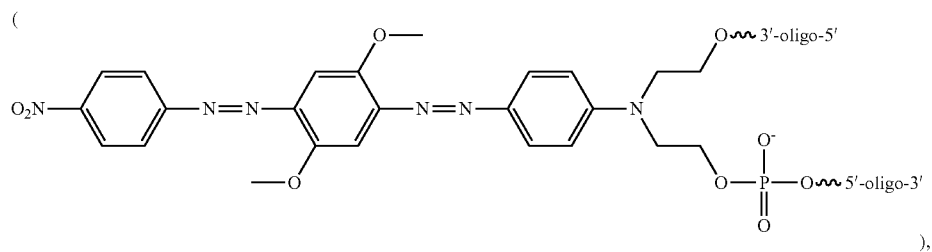

BHQ3

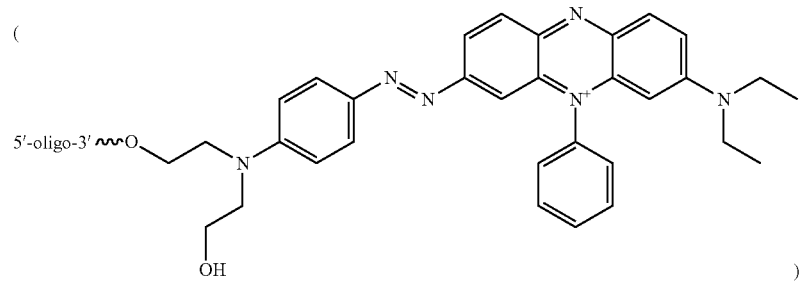

and BHQ0

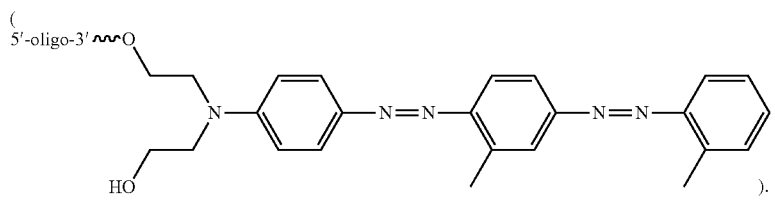

60. A method of measuring temperature of a sample, comprising:
  contacting the sample with a nanothermometer of any one of aspects 1-59; and
  measuring fluorescence of the nanothermometer, whereby fluorescence intensity is indicative of temperature.

61. A method of measuring temperature of a sample, comprising:
  contacting the sample with a nanothermometer of any one of aspects 1-59; and
  measuring fluorescence of the nanothermometer, whereby fluorescence intensity is indicative of temperature over a calibrated temperature range.

DETAILED DESCRIPTION

Figure 1:
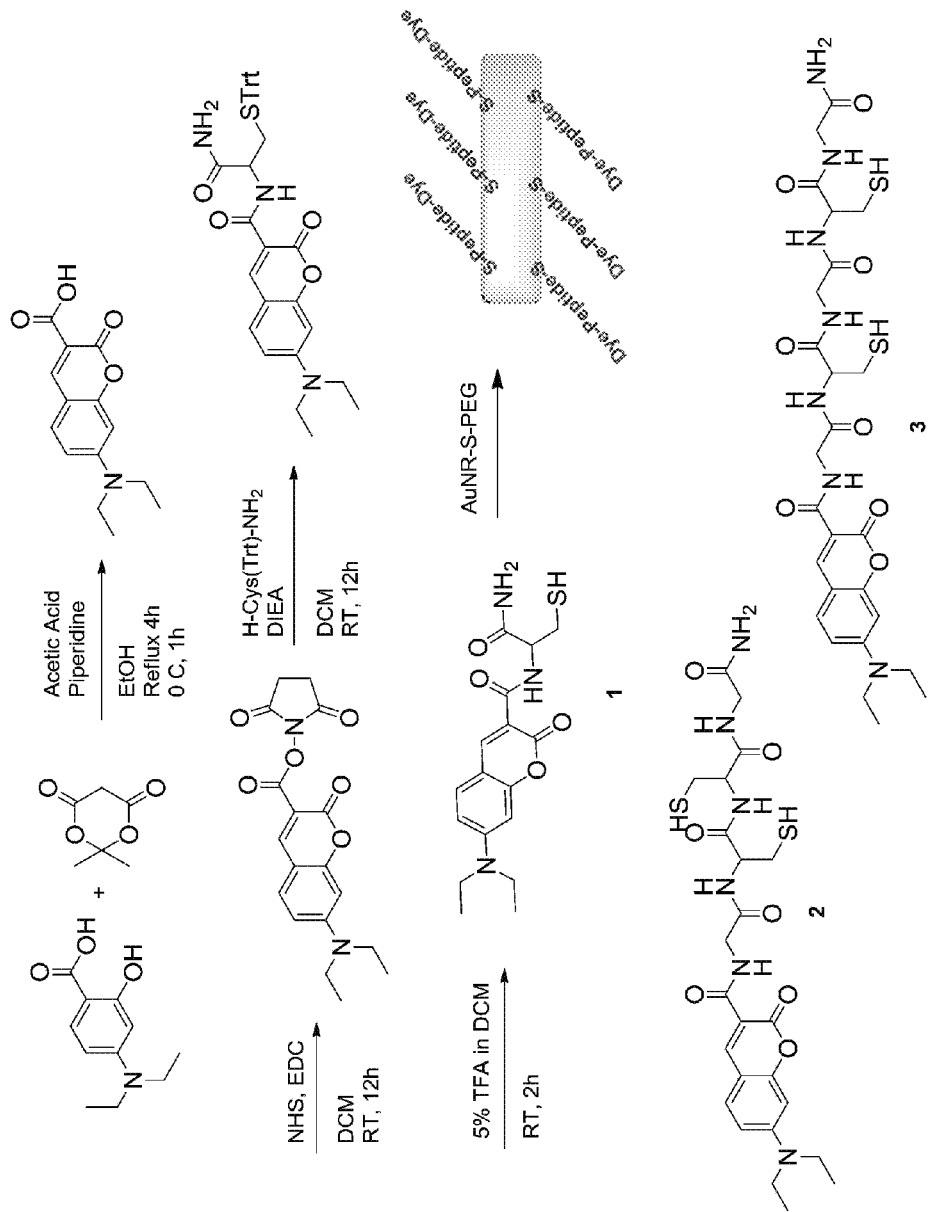
FIG. 1 illustrates synthesis of dye-peptide conjugate 1 and synthesis of nanothermometers.

The present inventors present a new concept of clinically relevant nanothermometers. Gold-nanoparticle based constructs with temperature sensitive linkers, and a fluorophore showed low fluorescence at the body temperature ~37° C. The fluorescence was triggered at elevated temperatures. Irreversibility of the signal and the overall increase in fluorescence>10 times after a complete heating-cooling cycle indicated applicability as nanothermometers. The nanothermometers reporting function can be adjusted by changing the type of temperature-sensitive linker. This material can be utilized with thermal ablation therapies to report temperature and control the heating process. Nanothermometers of the present teachings can be used in various clinical applications, such as, without limitation, laser ablation, radiofrequency heating, and inclusion NIR dyes for deeper light penetration.

Methods

Methods and compositions described herein utilize laboratory techniques well known to skilled artisans, and guidance can be found in laboratory manuals and textbooks such as Sambrook, J., et al., Molecular Cloning: A Laboratory Manual, 3rd ed. Cold Spring Harbor Laboratory Press, Cold Spring Harbor, N.Y., 2001; Spector, D. L. et al., Cells: A Laboratory Manual, Cold Spring Harbor Laboratory Press, Cold Spring Harbor, N.Y., 1998; and Harlow, E., Using Antibodies: A Laboratory Manual, Cold Spring Harbor Laboratory Press, Cold Spring Harbor, N.Y., 1999; Hedrickson et al., Organic Chemistry 3rd edition, McGraw Hill, New York, 1970; Carruthers, W., and Coldham, I., Modern Methods of Organic Synthesis (4th Edition), Cambridge University Press, Cambridge, U.K., 2004; Curati, W. L., Imaging in Oncology, Cambridge University Press, Cambridge, U.K., 1998; Welch, M. J., and Redvanly, C. S., eds. Handbook of Radiopharmaceuticals: Radiochemistry and Applications, J. Wiley, New York, 2003.

Materials

Solvents (methanol, DMF, DMSO, DCM, acetonitrile) and reagents for synthesis (CTAB, $HAuCl_4$, $AgNO_3$, $NaBH_4$, HOBT, HBTU) were purchased from Sigma-Aldrich Inc. and ThermoFisher Sci. and used without further purification. Protected amino acids Fmoc-Gly-OH, Fmoc-Cys(Trt)-OH were purchased from Chem-Impex International Inc., $mPEG_{2000}$-thiol was received from JenKem Technology. Millipore water (18.2 MΩ) was used throughout the study.

Analysis.

Dye-peptide conjugates 1-3 were analyzed using LC/MS-ESI analysis in the positive mode conducted on a Shimadzu LCMS 2010A equipped with a UV/Vis detector at different wavelengths using a reversed-phase C-18 Vydac column (218TP, 4.6×50 mm) at a flow rate of 0.7 mL/min with a gradient 10-95% acetonitrile in water (both solvent contained 0.1% TFA).

Optical Measurements.

UV/Vis spectra of samples were recorded on a Beckman Coulter DU 640 UV-visible spectrophotometer. Steady state fluorescence spectra were recorded on a Horiba Fluorolog-3 (Horiba Jobin Yvon spectrofluorometer) equipped with temperature controlled cuvette holder in equilibrium with water bath. Fluorescence anisotropy was conducted in L-format with automated Glan-Thompson polarizing prisms.

Transmission Electron Microscope (TEM).

TEM images were acquired on a JEOL 2100F FE-(S) TEM system at room temperature using a Formvar/Carbon on 200 mesh TEM grid (Ted Pella, Inc) under the following conditions: $1.5 \times 10^{-5}$ Pa, emission current 150 uA, electron acceleration voltage 200 kV.

Optical Measurements.

The anisotropy values for each dye and dye-conjugate were determined at relatively low concentrations with absorption below 0.2 a.u. to avoid aggregation of the nanoconstruct. For single point measurements the excitation was set at 410 nm and the emission at 440 nm. Slits were set to 5 nm and integrating time to 0.5 sec. Each single point measurement was conducted in quadruplicates at T:=20° C. in 1×1 cm$^2$ quartz cuvette using a temperature controlled cuvette holder in conjunction with a circulating water bath. The alignment of the polarizers was checked daily by recording the anisotropy of LUXDOX-40® (40% weight suspension of colloidal silica, Sigma-Aldrich) suspension in water (ex/em. 440/440 nm).

Sample Preparations for Optical Measurements.

Nanothermometers were dissolved in 1×PBS buffer (Fisher Scientific) and placed in 1×1 cm$^2$ quartz cuvettes prior to optical measurements. Dye-peptide conjugates were prepared as stock solution 1 mg/mL in DMSO and added to 1×PBS, at the final concentration 1 µg/mL.

Thermal Ablation Imager.

Figure 15:
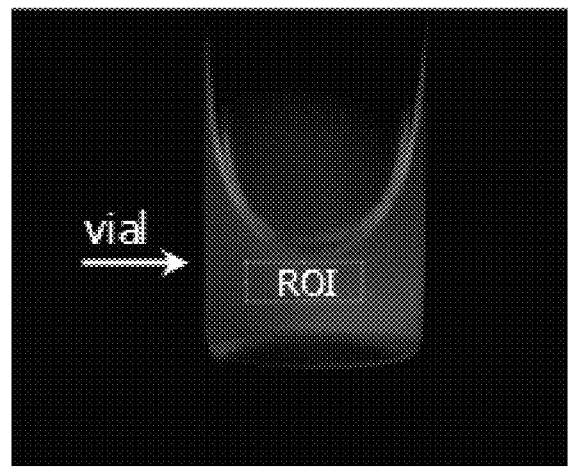
FIG. 15 illustrates an image of a vial using a thermal ablation imager.

A thermal ablation imager featured a light source made from a mounted high power LED 405 nm (410 mW nominal power) (Thorlabs) equipped with a collimating lens, a bandpass filter 410 nm, 10 nm bandwidth, Ø25.4 mm, ED1-S50-MD—and 50° Square Engineered Diffuser with SM1-threaded mount, Ø1" (Thorlabs). The emission was measured with INFINITY3-1C—1.4 Megapixel Color Cooled CCD Camera (Lumenera Corp.) with APO-Xenoplan 1.4/23 mm SWIRON C-Mount Lens (Schneider Inc.) and a broadband emission filter 500 nm, 80 nm bandwidth, Ø25.4 mm (Edmund Optics, Inc) placed in front of the lens. Images were made every 20 sec, and analyzed by ImageJ software (National Institutes of Health). A region of interest (ROI) was drawn over the vial (as shown in FIG. 15), and the intensity over the same ROI was evaluated for every image. Simultaneous temperature measurements were conducted using a T-type hypodermic needle Teflon coated thermocouple (17 gauge) (J-Kem Scientific. Inc) connected to a high resolution (0.1° C.) temperature controller (Model 210, J-Kem Scientific. Inc). Fast heating of the solution in the glass vial was achieved with a variable temperature heat gun. This gun produces a stable output. The temperature inside the vial was monitored with a thermocouple, while the fluorescence was recorded on a cooled CCD camera. The images produced (FIG. 15) were analyzed by ImageJ software.

EXAMPLES

The present teachings include descriptions provided in the Examples that are not intended to limit the scope of any aspect or claim. Unless specifically presented in the past tense, an example can be a prophetic or an actual example. The following non-limiting examples are provided to further illustrate the present teachings. Those of skill in the art, in light of the present disclosure, will appreciate that many changes can be made in the specific embodiments that are disclosed and still obtain a like or similar result without departing from the spirit and scope of the present teachings.

Example 1

This example illustrates the synthesis of a dye-peptide conjugate of the present teachings.

The dye-peptide conjugates 1-3 were prepared using a standard solid state peptide synthesis protocol (FIG. 1). Briefly, Fmoc was removed from Rink amide resin with 20% piperidine in DMF with shaking and washed with DMF and DCM. After filtration DMF, Fmoc protected amino acid, DIEA, a solution of coupling reagents HOBT and HBTU in DMF were added. After the reaction was completed, the solvent was removed, and Fmoc was deprotected. The resin was washed, filtered and the next amino acid was added and the procedure repeated. After addition of the final amino acid, coumarin-NHS[30] was added to the chain. The product was cleaved from the resin filtered and purified by reverse phase flash chromatography. A representative synthesis of compound 2: Fmoc was removed from 0.58 mmol Rink amide resin (0.10 g, 0.058 mmol loading) with 20% piperidine in DMF 3×10 minutes each with shaking. Deprotected resin was then washed with DMF 3×10 min and DCM 3×10 min with shaking. After filtration following reagents were added in this order: DMF (0.3 mL), Fmoc protected amino acid 3 eq. (0.17 mmol) in DMF (0.30 mL), DIEA (0.05 mL), and a solution of HOBT (0.17 mmol) and HBTU (0.17 mmol) in DMF (0.30 mL). This reaction was shaken vigorously for 2 hours at room temperature, the solvent was removed, and Fmoc was deprotected with 20% piperidine in DMF 3×10 minutes with shaking. The resin was washed with DMF 3×10 min and DCM 3×10 min with shaking. After filtration, the next amino acid was added as previously described. After addition of the final amino acid coumarin-NHS was added according to the following procedure.

Figure 19:
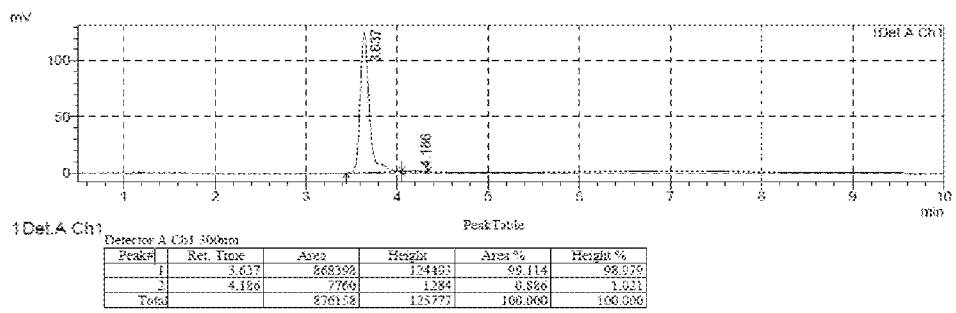
FIG. 19 illustrates HPLC and MS spectra of dye-peptide conjugate $NH_2$-Gly-Cys-Cys-Gly-$NH_2$ (SEQ ID NO:1).
Figure 19:
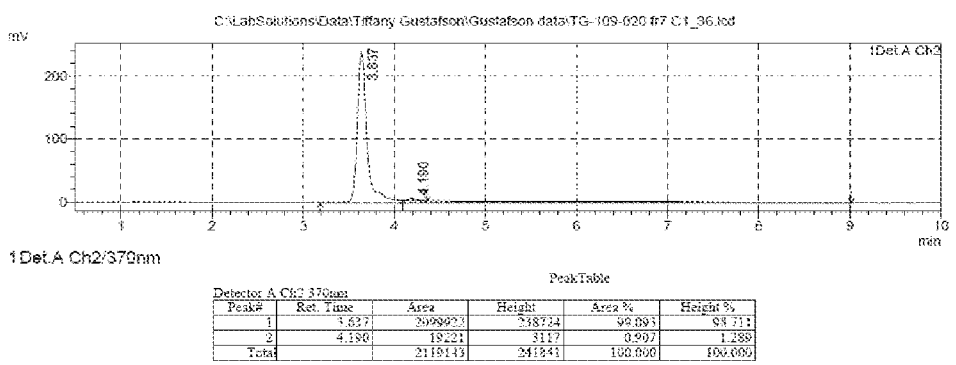
Figure 19:
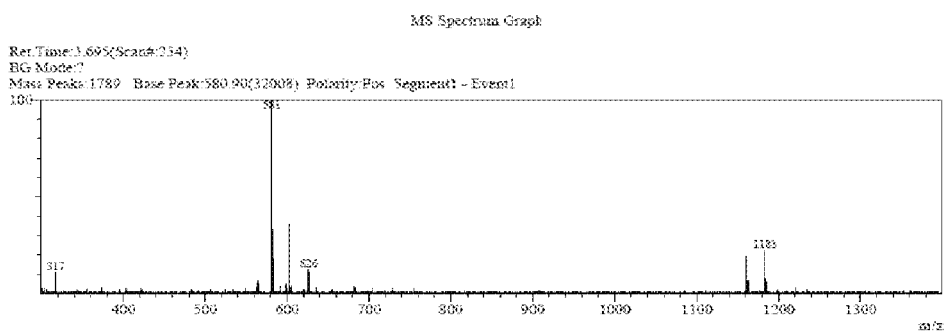

Coumarin-NHS (1.12 mmol) (Gustafson, T. P., et al., Organic & Biomolecular Chem. 9: 4752-5, 2011) was combined with DIC (0.12 mmol) in DMF (1 mL) for 15 minutes. HOBt (0.044 mmol) was added and the solution was left for 5 min with stirring. The resin was wet with DMF (0.5 mL) and the dye solutions was added and reacted for 4 h. The resin was collected by filtration and washed with DMF and DCM 3× each. The resin was dried by filtration and placed into a glass vial. To the resin was added a solution containing 94% TFA, 2.5% 1,2-ethanedithol (EDT), 2.5% H$_2$O, and 1% triisopropylsilane (TIS)-(4 mL). The reaction was shaken for 2 h at room temperature, then filtered through glass wool to remove the beads, and evaporated. The product was purified by reverse phase (C18) flash column eluted with 50 mL of acetonitrile:water at each concentration starting with 10% acetonitrile and increasing to 60% acetonitrile in 10% increments. Fractions were tested by LCMS to identify the product, collected and the solvent was evaporated under vacuum. The final product was lyophilized. For compound 2, 30 mg of orange product was collected (>98% pure by LCMS, UV detectors 300 nm and 370 nm, see FIG. 19). MH$^+$=581, dimer 2MH$^+$=1183.

Example 2

This example demonstrates the synthesis of a nanothermometer of the present teachings.

Figure 2:
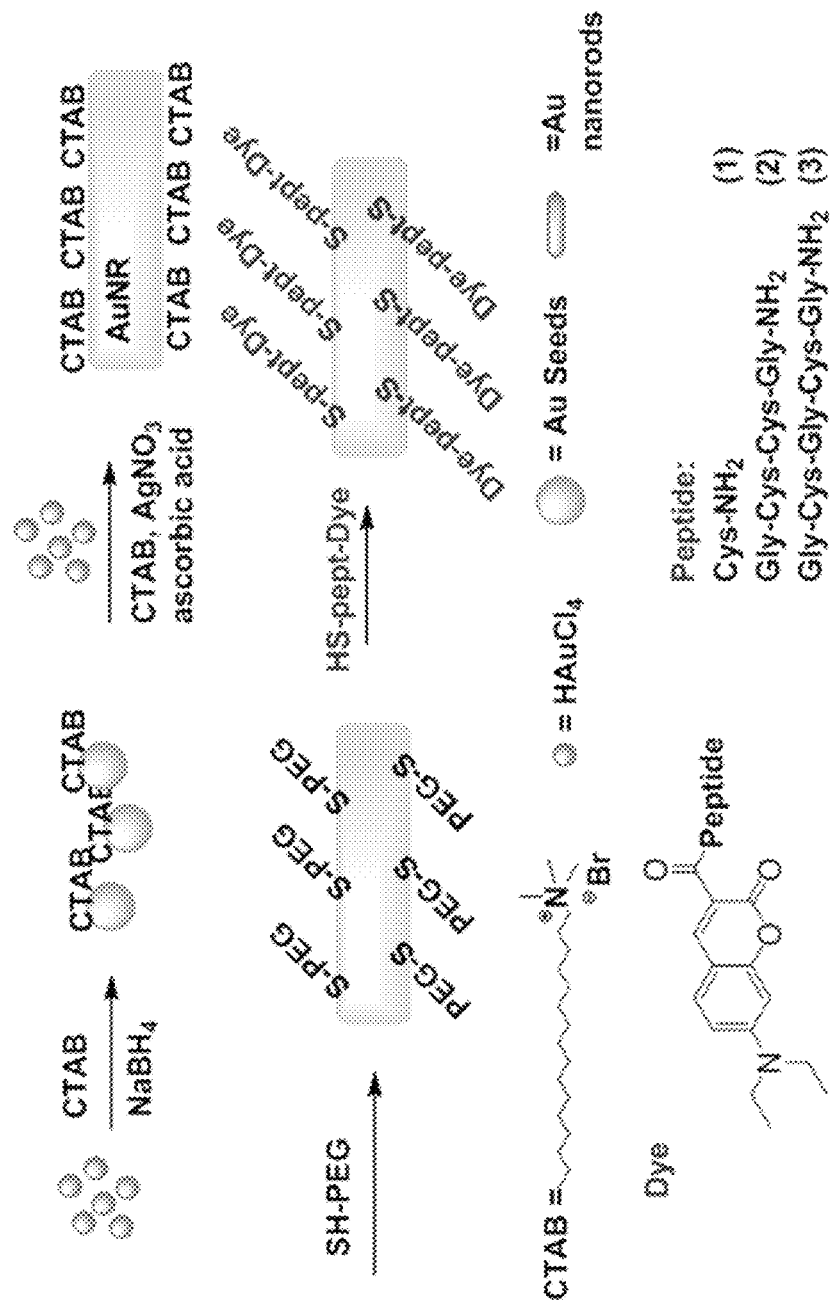
FIG. 2 illustrates steps of nanothermometer synthesis.
Figure 3:
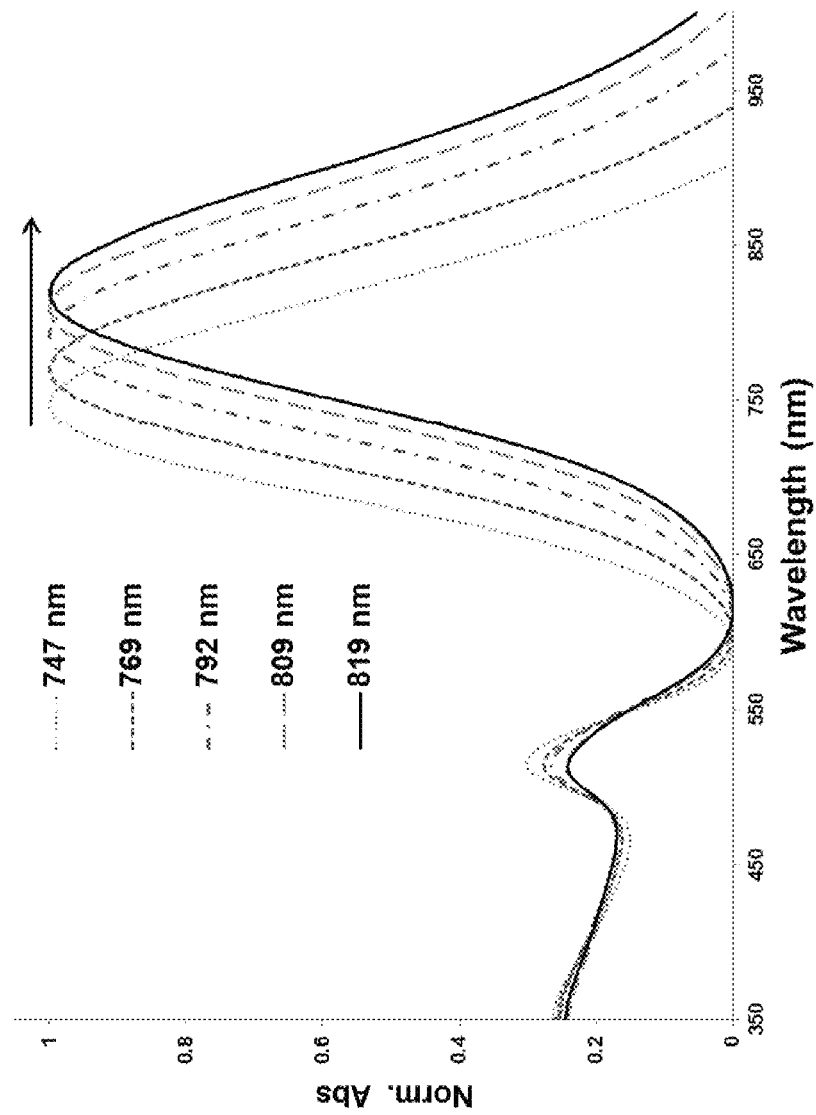
FIG. 3 illustrates representative absorption spectra of synthesized gold nanorods protected with CTAB with varied amount of silver nitrate. An arrow shows the increase of silver nitrate amount.
Figure 4:
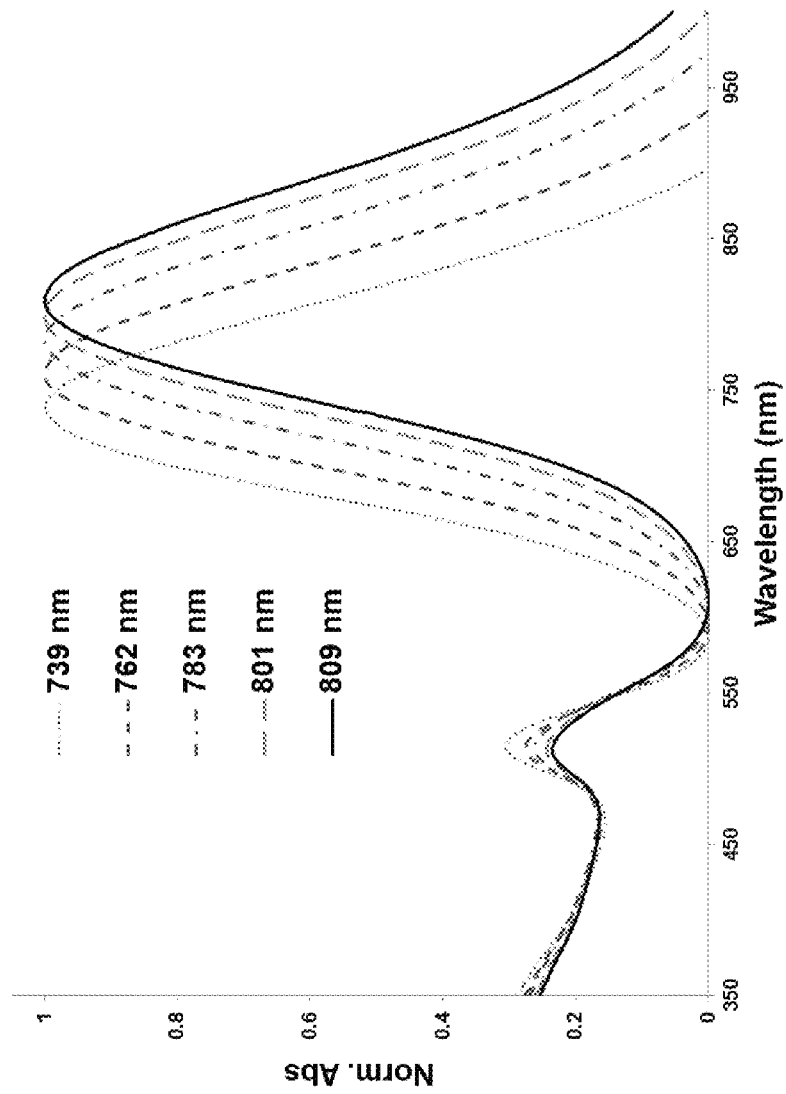
FIG. 4 illustrates the same gold nanorods as in FIG. 3 after a ligand exchange with $mPEG_{2000}$ thiol (Au-NS-R-PEG)
Figure 7:
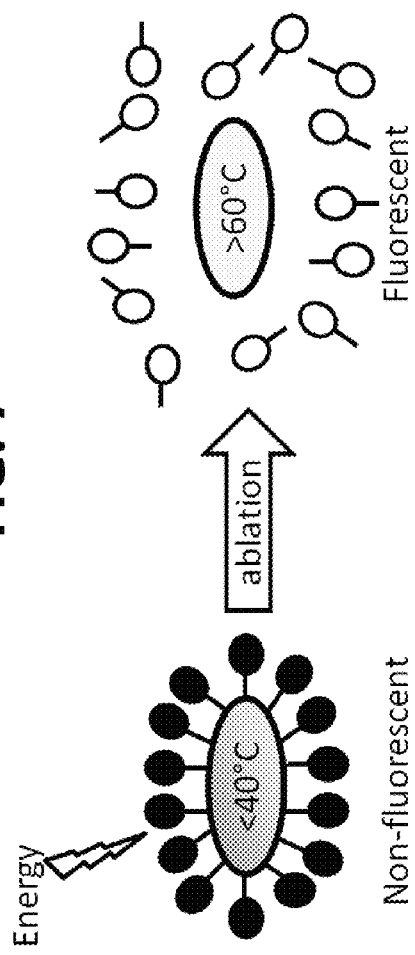
FIG. 7 illustrates overall design of nanothermometers.

The overall design of the nanothermometers is shown in FIG. 7. The synthesis of the nanothermometers involved several convergent steps (FIG. 2). First, gold nanorods were prepared via an established procedure using a seed mediated synthesis in the presence of cetyl trimethyl ammonium bromide (CTAB) (See Chen, Y. S., et al., Nano Lett. 11: 348-54, 2011). Briefly, 5 mL of CTAB(aq) solution at 30-35° C. (0.2 M) was first mixed with 5 mL of HAuCl$_4$(aq) solution (0.5 mM) with stirring. Then 0.60 mL of ice-cold NaBH$_4$(aq) solution (0.01 M) was added to the mixture and vigorously stirred for 2 min at 30° C., which resulted in the formation of a brownish yellow seed solution. The growth solution was prepared by adding 0.15-0.2 mL AgNO$_3$(aq) (4 mM) and then 5 mL of HAuCl$_4$(aq) (1 mM) solutions to a 5 mL of CTAB(aq) at 30-35° C. (0.2 M) solution, under gentle mixing, followed by 70 µL of ascorbic acid (0.0788 M) solution. To grow nanorods, 12 µL of the seed solution was added to the growth solution at 30° C. under gentle stirring for 30 seconds. The transparency of the solution changed to burgundy red within 10-20 min. The solution then aged for another 12-18 hours at 27-30° C. before being centrifuged at 13,000 rpm for 10 min. The collected CTAB gold nanorods were re-dispersed in water and stored at room temperature. The nanorods were synthesized with a maximum longitudinal absorption ranging from 700-850 nm (FIG. 3, FIG. 4), where $\lambda_{max}$ was dependent on the aspect ratio of the rods as was determined by the amount of AgNO$_3$ used. As direct displacement of CTAB with peptide conjugates was found to be difficult, CTAB was first replaced by mPEG$_{2000}$-thiol through ligand exchange as described (Chen, Y. S., et al., Nano Lett. 11: 348-54, 2011). This had little effect on the shape and optical properties of the nanorods (FIG. 8a, FIG. 8b. FIG. 3, FIG. 4). Briefly, the CTAB-stabilized gold nanorod dispersion was added to an equal volume of mPEG-thiol (0.2 mM) aqueous solution under vigorous stirring. The mixture was sonicated for 5 minutes and left to react for 2 hours. Excess mPEG-thiol molecules were removed by centrifugation filtration (Amicon 50,000 D cutoff, Millipore Inc.) at 3,300 rpm for 10 min and the PEGylated gold nanorods were re-suspended in water. Centrifugation filtration was repeated twice. This had little effect on the optical shape properties of the nanorods (FIG. 4). Second, the fluorescent dye 7-diethylaminocoumarin-3-carboxylic acid was conjugated to cysteine rich peptides (FIG. 2) (Gustafson, T. P., et al., Org. Biomol. Chem. 9: 4752-5, 2011). This dye, which absorbs at ca. 400 nm and emits at 460 nm, was employed as a temperature reporter. It was selected to avoid overlapping with the absorbance of the nanorods (transverse 532 nm and longitudinal surface plasmon resonances 650-800 nm) to facilitate detection in the nanoconstructs' optical spectra. This selection allows for method development and optimization of ligand exchange procedures for achieving a high density of the dye on the surface of the gold. Coumarins, like many other organic fluorophores, are easily self-quenched at high concentrations as a result of intermolecular interactions and aggregation.

The resulting peptide-dye conjugates were then added to the PEG protected gold nanorods to replace the PEG shell. TEM images of the gold nanorods with dye-peptide conjugates indicated a lack of aggregation and retention of their original shape and size following ligand exchange steps (FIG. 8c). In these experiments, the PEG coated gold nanorod dispersion was added to an equal volume of coumarin-peptide conjugates 1-3 dissolved in 0.5% DMSO in water (0.2 mM) under vigorous stirring. The mixture was sonicated for 10 minutes and left to react overnight with gentle stirring. mPEG-thiol and excess coumarin-cystamine dye conjugate were removed by centrifugation filtration (Amicon 50,000 kD cutoff, Millipore, Inc.) at 3,300 rpm for 10 min. The eluent was decanted and the dye-conjugate covered gold nanorods were re-suspended in water. Centrifugation filtration was repeated several times until minimal coumarin absorption was present in the eluent. The formed nanorods covered with dye-peptide conjugates (nanothermometers) were then dispersed in ~7 mL of water and stored at room temperature.

Figure 5:
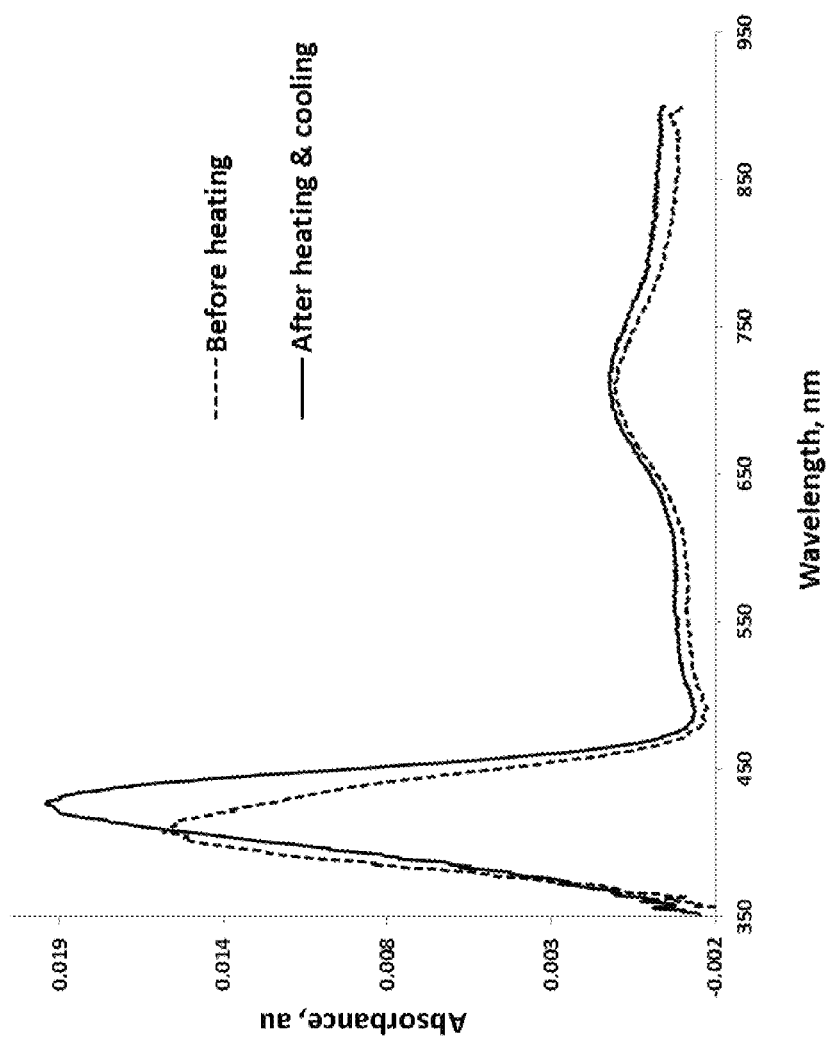
FIG. 5 illustrates spectra of nanothermometers made with dye-peptide conjugate 2 before and after thermal treatment using slow temperature ramp.
Figure 6:
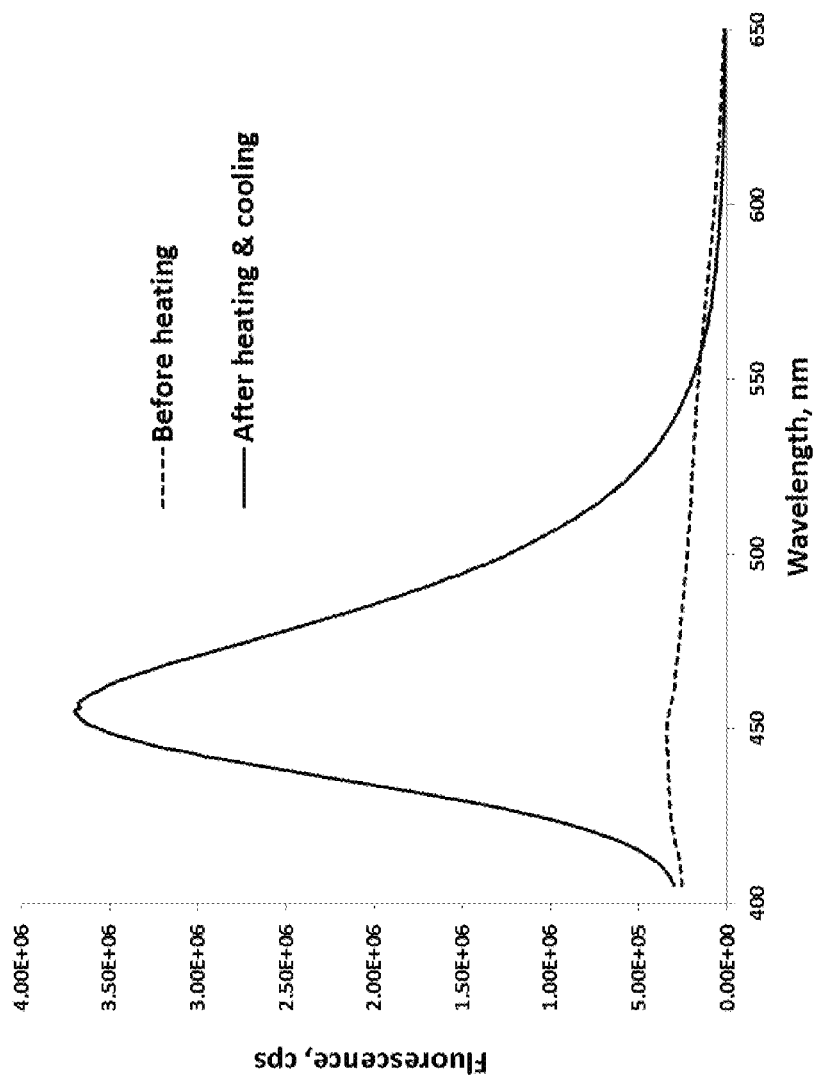
FIG. 6 illustrates emission spectra of gold-dye-peptide conjugate 2 before and after thermal treatment using slow temperature ramp.

Successful exchange/attachment was apparent from the UV/Vis spectra of the purified nanoconstructs which featured an absorption band at 400 nm originating from coumarin, and two bands at 532 and 700 nm originating from the gold nanorods (FIG. 5). The observed broadening and small hypsochromic shift of the gold nanorods' longitudinal absorption suggested a change in the nanorods' surrounding medium. The compound was weakly fluorescent due to incomplete quenching of the dye (FIG. 6).

Without being limited by theory, the nanothermometer linker, which holds the dye to the Au surface, assists with thermal activation and can serve two purposes: i. to suppress fluorescence by placing dye molecules close to each other, and ii. to function as a temperature sensor. For the latter, cysteine rich peptides were employed. The ability of gold nanoparticles to react with thiols is well known (Black, K. C., et al., Mol. Imaging, 2008, 7, 50-57; Tong, L. et al., Photochem. Photobiol., 2009, 85, 21-32). The formed Au—S bond is moderately strong for a metal-non-metal interaction, with a homolytic strength of 40 kcal/mol (Nuzzo, R. G. et al., J. Am. Chem. Soc., 1990, 112, 558-569) and temperature-dependent dissociation. A typical Au—S bond is stable under anhydrous conditions up to 200-300° C. but undergoes dissociation below 100° C. in aqueous media. (Bhatt, N., et al., Nanomedicine (Lond), 2011, DOI:10.1016/j.nano.2011.10.012). This principle of Au—S bond thermal sensitivity was the basis of the presented nanothermometers.

Figure 8:
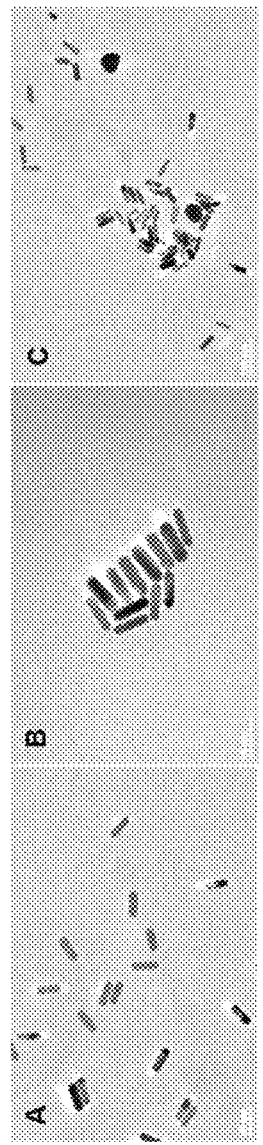
FIG. 8 illustrates transmission electron microscope images of gold nanorods.

TEM images of the gold nanorods with CTAB, PEG and dye-peptide conjugates indicated a lack of aggregation and retention of their original shape and size following both ligand ex-change steps (FIG. 8). In FIG. 8, (A) shows CTAB coated nanorods, (B) shows nanorods after ligand exchange with mPEG$_{2000}$-thiol and (C) shows dye-peptide conjugate 2 coated nanothermometers. The average size of the nanorods at all stages of nanothermometer preparation was 50×15 nm.

Example 3

This example illustrates evaluation of the synthesized nanothermometers.

In these experiments, following nanothermometer preparation, peptide-dye conjugates 1-3 were evaluated to determine the effect of i). the number of thiols and ii). the placement of thiols, relative to one another, within the linker. The temperature release profile was recorded for each sample in PBS buffer using two temperature ramps—slow, linear ramp 0.9° C./min of heating, total 60 min. and fast, non-linear ramp from 20 to 85° C., total 8 min (FIG. 9, FIG. 10) While the first is better suited for kinetic measurements of peptide-dye conjugate release, the latter is more relevant for thermal ablations in clinics. Corresponding data were obtained using a standard fluorescence spectrophotometer with a temperature controlled cuvette holder and by using a thermal ablation imager.

Figure 10:
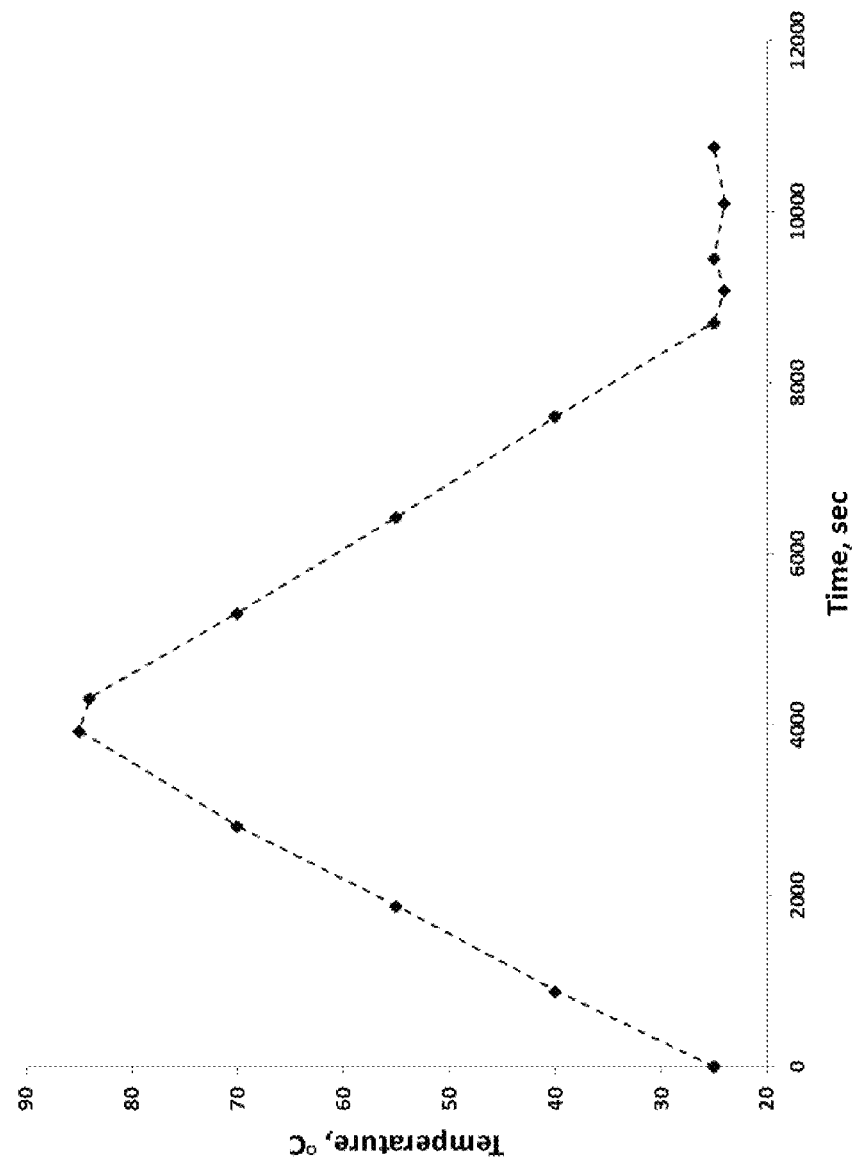
FIG. 10 illustrates slow temperature ramp.

In these experiments, nanothermometers were dispersed into PBS, pH 7.0 and subject to heating-cooling cycle. For slow temperature ramp (heating 0.9° C./min, cooling 0.8° C./min), gold nanorods coated in coumarin-peptide conjugates 1-3 were dispersed into PBS, pH 7.0 at a concentration of 5 µL/mL. For a free dye-peptide conjugate, a stock solution 1 mg/mL in DMSO was added to PBS, pH 7.0, and final concentration was 1 µg/mL. Temperature dependent fluorescence was monitored by fluorescence spectrophotometer from 25° C. to 85° C. and back to 25° C. in 15° C. increments, holding for 5 minutes at each temperature. Full emission spectra (excitation 395 nm) were recorded for each temperature point. Overall temperature heating-cooling cycle is shown in FIG. 5. Full emission spectra (excitation 395 nm) were recorded for each temperature point. Heating 0.9° C./min, cooling 0.8° C./min. Full emission spectra (excitation 395 nm) were recorded for each temperature point. Overall temperature heating-cooling cycle is shown in FIG. 10.

Figure 9:
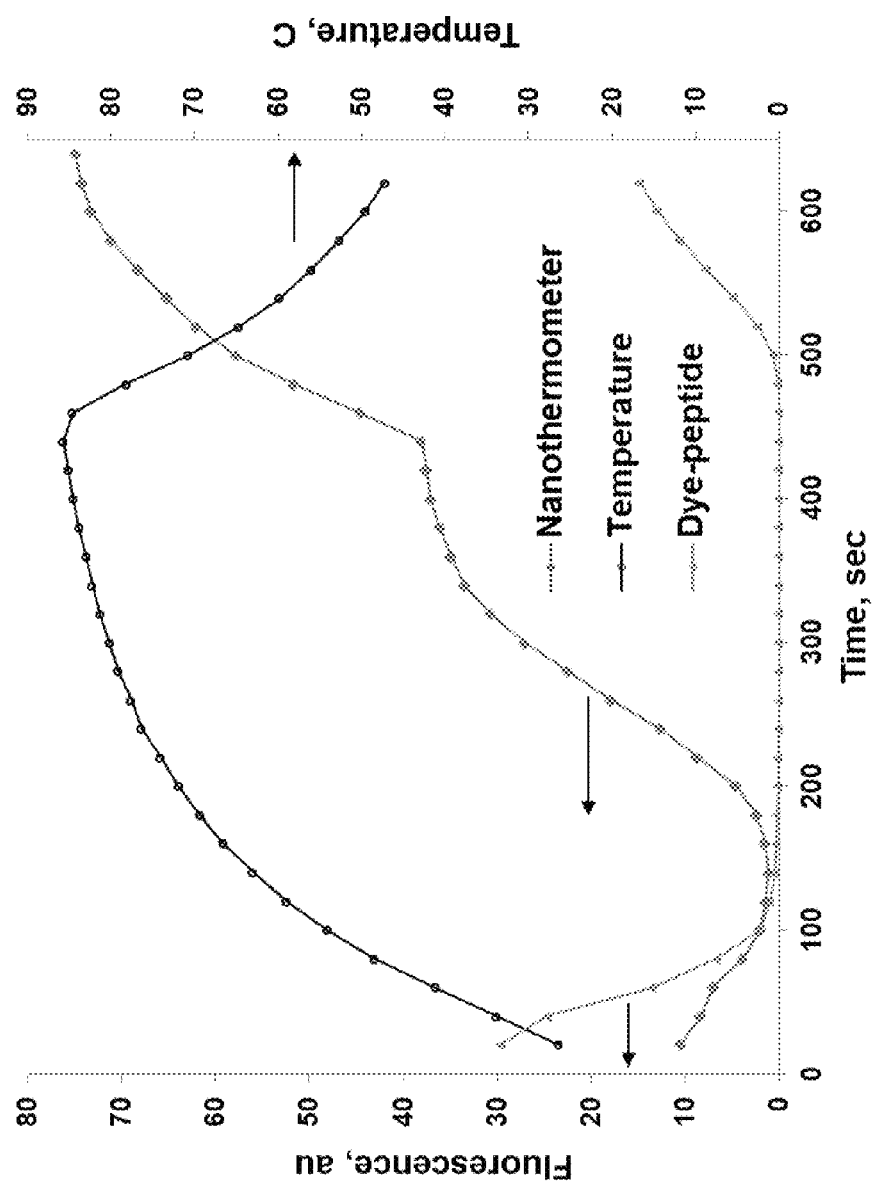
FIG. 9 illustrates overall heating-cooling cycle and corresponding changes of fluorescence for nanothermometers.

For fast temperature ramp, gold nanorods coated in coumarin-peptide conjugates 2 were dispersed into PBS, pH 7.0 at a concentration of 10 µL/mL and placed in a 1.5 mL glass vial. Temperature based release of dye-conjugate was monitored by a CCD camera under continuous heating from 25° C. to 85° C. from a heat gun in "hot" mode and subsequent air in a "cold" mode. Overall temperature heating-cooling cycle is shown in FIG. 9. Images were collected every 20 seconds and analyzed with ImageJ software.

Figure 11:
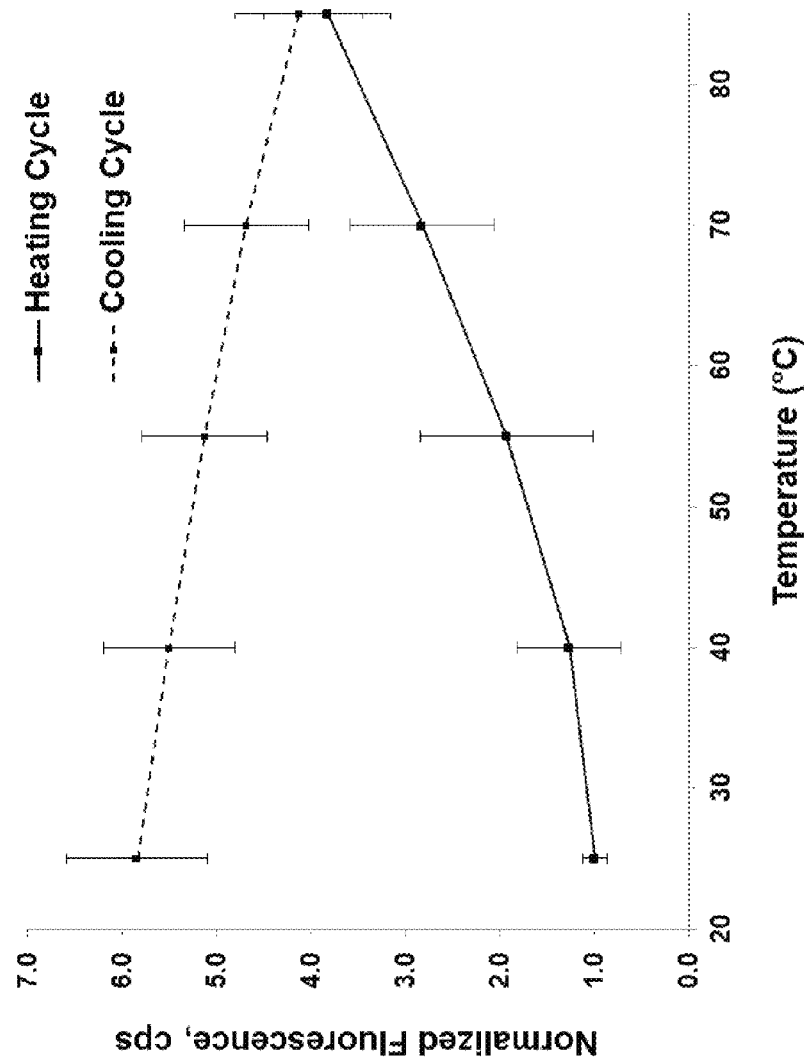
FIG. 11 illustrates representative temperature release profile of a nanothermometer with dye-peptide conjugate 2 during a slow heating-cooling cycle from 25° to 85° to 25° C. Error bars indicate standard deviation from four samples.
Figure 13:
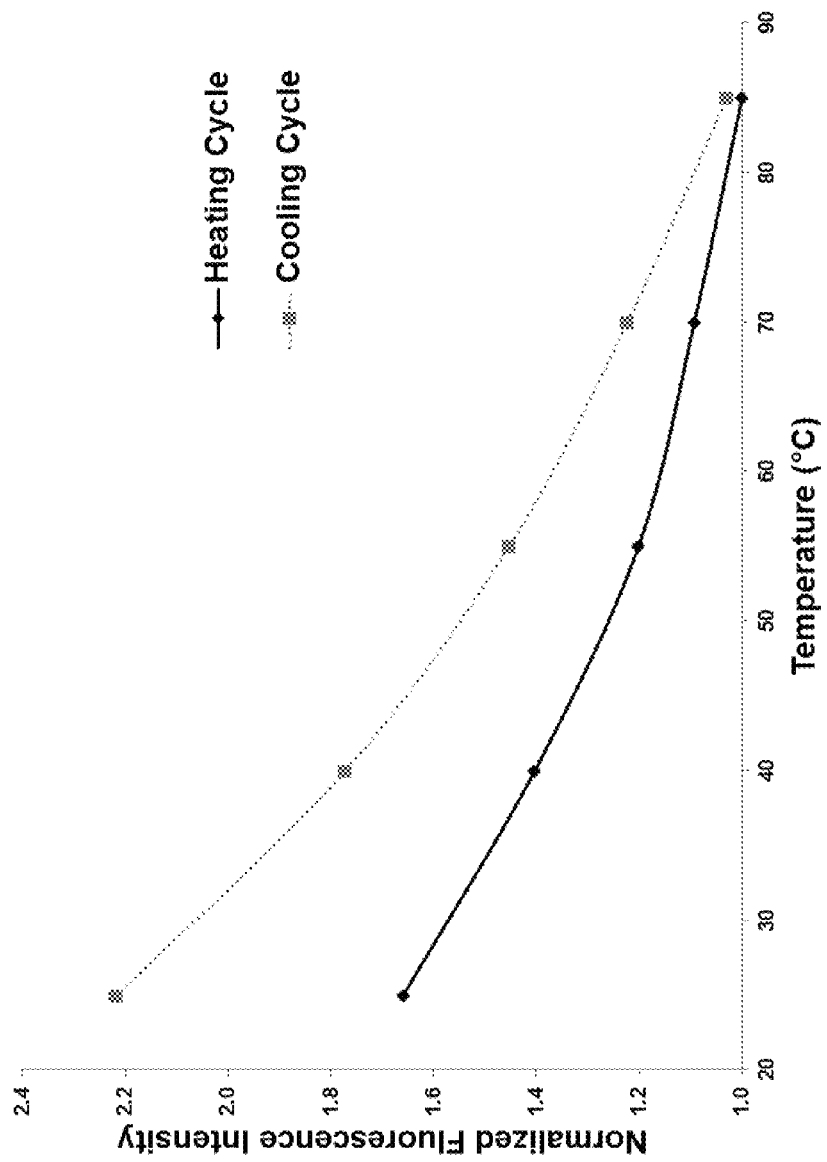
FIG. 13 illustrates temperature release profile of free dye-peptide conjugate 2 under slow temperature ramp conditions.

As a general trend, fluorescence intensities for all three compounds under slow temperature conditions were enhanced at higher temperatures (FIG. 5, FIG. 6, FIG. 11). Subsequent cooling of the solution with nanothermometers did not lead to the original quenched fluorescent state, which suggests the entropy driven irreversible nature of Au—S bond cleavage. The control with free dye-peptide conjugate demonstrated an opposite trend as fluorescence was quenched with increasing temperature (FIG. 13). In fact, we observed further increase of the fluorescence during cooling. This enhancement was attributed to the general temperature dependent properties of fluorescent dyes with rotatable bonds (Benninger, R. K., et al., *Anal. Chem.*, 2006, 78, 2272-2278; Berezin, M. Y., et al., *Chem. Rev.*, 2010, 110, 2641-2684).

Subsequent cooling of the solution with nanothermometers did not lead to the original quenched fluorescent state, which suggests the irreversible nature of Au—S bond cleavage. In fact, further increase of the fluorescence during cooling was observed. This enhancement was attributed to the general temperature dependent properties of fluorescent dyes with rotatable bonds. Fluorescence anisotropy data confirmed almost complete departure of the dye-peptide conjugate form the nanorods (Table 1). For example, in compound 1 the fluorescence anisotropy decreased from a relatively high value to a lower value after a heating-cooling cycle and became close to that of free dye-peptide conjugate. Such a decrease in fluorescence anisotropy was attributed to the faster mobility of a free dye-peptide conjugate compared to a slowly rotating nanorod. Despite the release, the nanoparticles did not aggregate. This stability was attributed to remaining PEG on the gold surface. PEG-SH forms stronger bonds with gold than other thiols, including cysteines and cystamines (Gao, J., et al., *Langmuir*, 2012, 28, 4464-4471) thus preventing aggregation after the release.

TABLE 1

Fluorescence anisotropy (r) of gold-dye-peptide conjugate 1 and a corresponding gold free dye-peptide 1.

| Sample | r[a] | St. Dev. |
|---|---|---|
| Au-dye-peptide[b] | 0.347 | 0.009 |
| Au-dye-peptide[c] | 0.153 | 0.014 |
| Free dye-peptide | 0.143 | 0.015 |

[a]PBS buffer, T = 20° C., ex/em. 410/440 nm,
[b]before heating,
[c]after a heating-cooling cycle.

Figure 12:
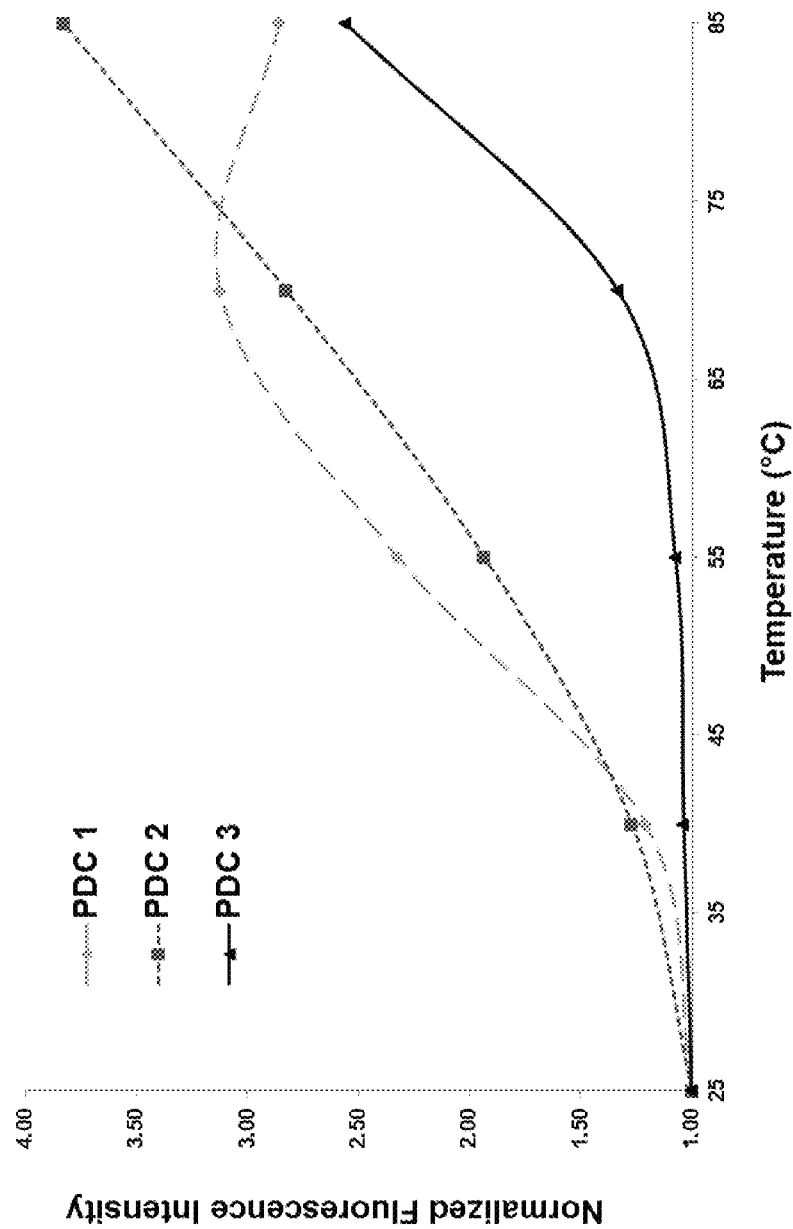
FIG. 12 illustrates temperature release profiles for peptide-dye conjugates (PDCs) 1-3 in PBS with slow temperature ramp from 25° to 85° C. Excitation/emission 395/462 nm, points were normalized to starting fluorescence intensity.

Thermal sensitivity of compounds 1-3 demonstrated the importance of linker design on their release profiles. The data indicated a massive release of compound 1 which contained a single thiol. The release began throughout the transition from 40° C. to 55° C. during a slow temperature rise (FIG. 12). Compound 2 which contained two thiols next to each other was more stable in this range (FIG. 11). Geometrical consideration suggests that an attachment of both cysteines on the gold surface introduces a conformational strain.

To release the strain, compound 3 was synthesized by adding a flexible spacer, a single glycine residue, between the two cysteine residues. As expected, 3 demonstrated a thermal activation at higher temperature near 70° C. (FIG. 12), indicating stronger binding of the linker to the gold surface.

The slow temperature ramp was useful to evaluate thermal properties of the synthesized nanothermometers. For clinical applications, however, the compounds must respond to a temperature increase over a much shorter time scale. The target temperatures in thermal ablations are usually reached between 2-3 minutes up to 10-15 minutes from the beginning of the treatment and are kept at that temperature for 5-15 min depending on the ablation method, type, and size of the tissue (Lencioni, R. A., et al., *Radiology.* 228: 235-40, 2003; McTaggart, R. A. and Dupuy, D. E., *Tech. Vase. Interv. Radiol.* 10: 102-13, 2007).

Figure 14:
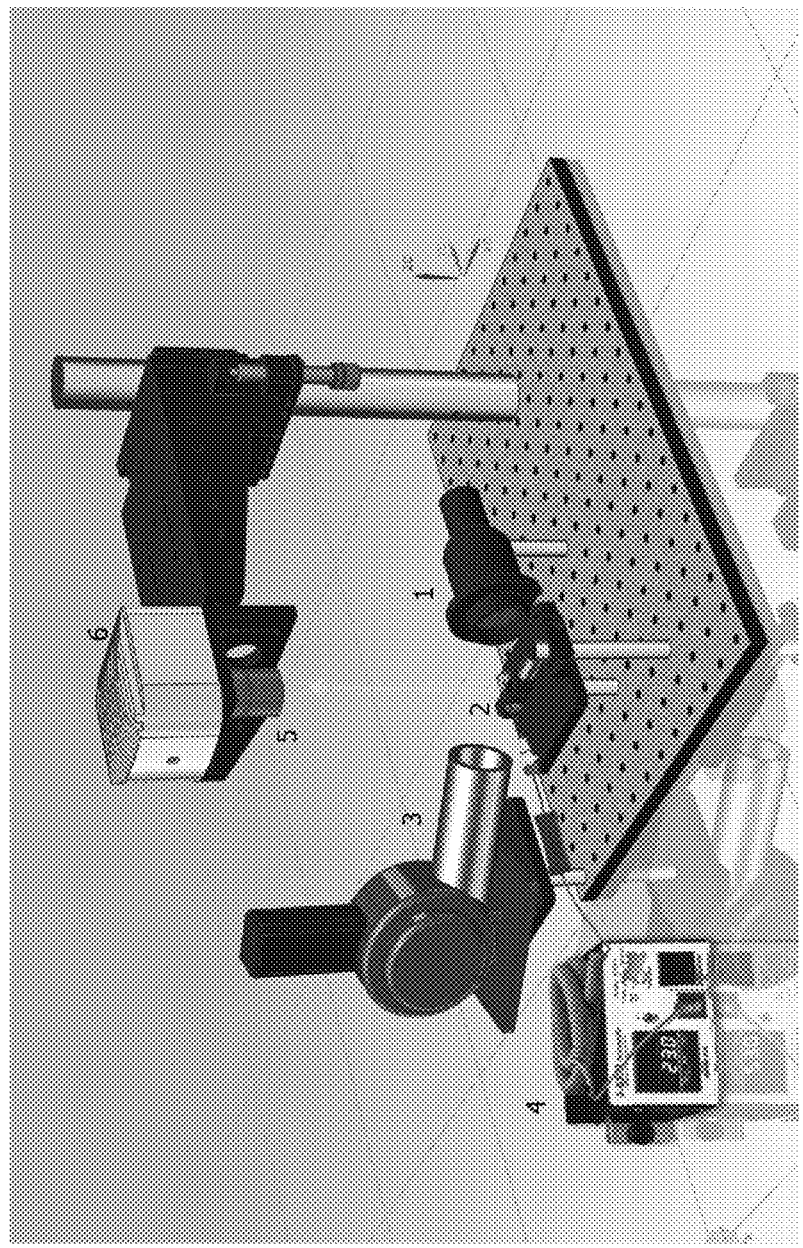
FIG. 14 illustrates schematics of a thermal ablation imager.

To evaluate the performance of the nanothermometers under fast temperature rising conditions (shown in FIG. 9), a solution of nanothermometers carrying peptide-dye conjugate 2 in a glass vial was placed into a thermal ablation imager (FIGS. 14 and 15).

Figure 16:
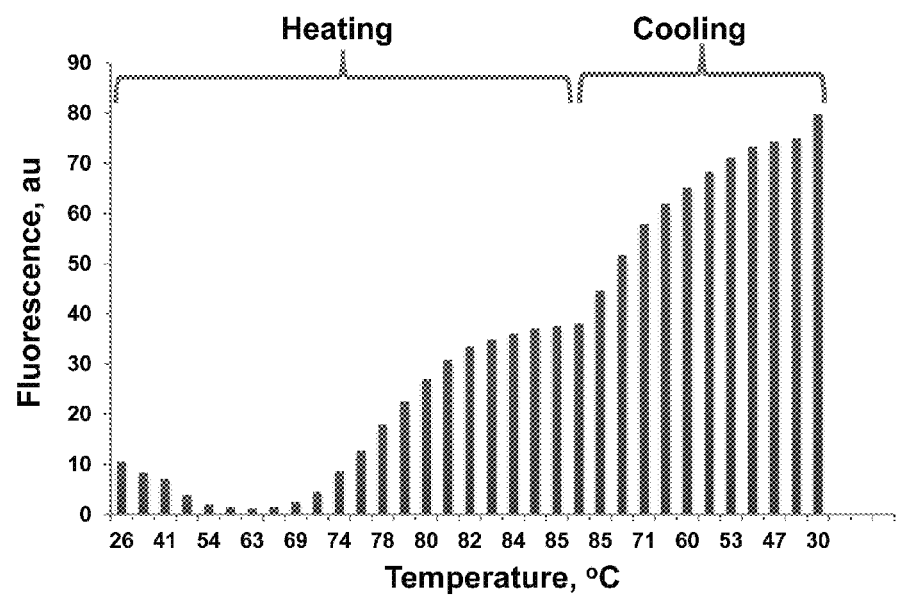
FIG. 16 illustrates fluorescence dependent profile of nanothermometers 2 as a function of temperature under fast thermal ramp conditions. Values were calculated from ROI shown in FIG. 15.
Figure 17:
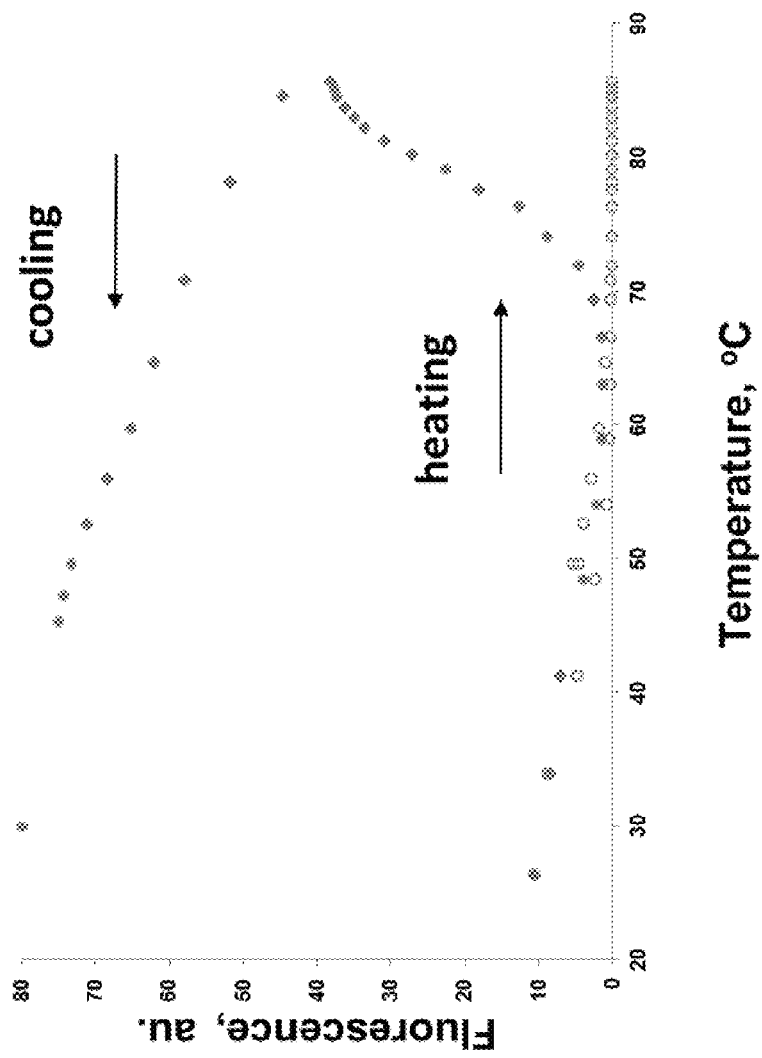
FIG. 17 illustrates change of the temperature inside the vial under fast heating-cooling conditions for nanothermometers carrying peptide-dye conjugate 2 (red diamonds) and free peptide-dye conjugate 2 (green empty circles). Normalized to the initial intensity=10 au.
Figure 18:
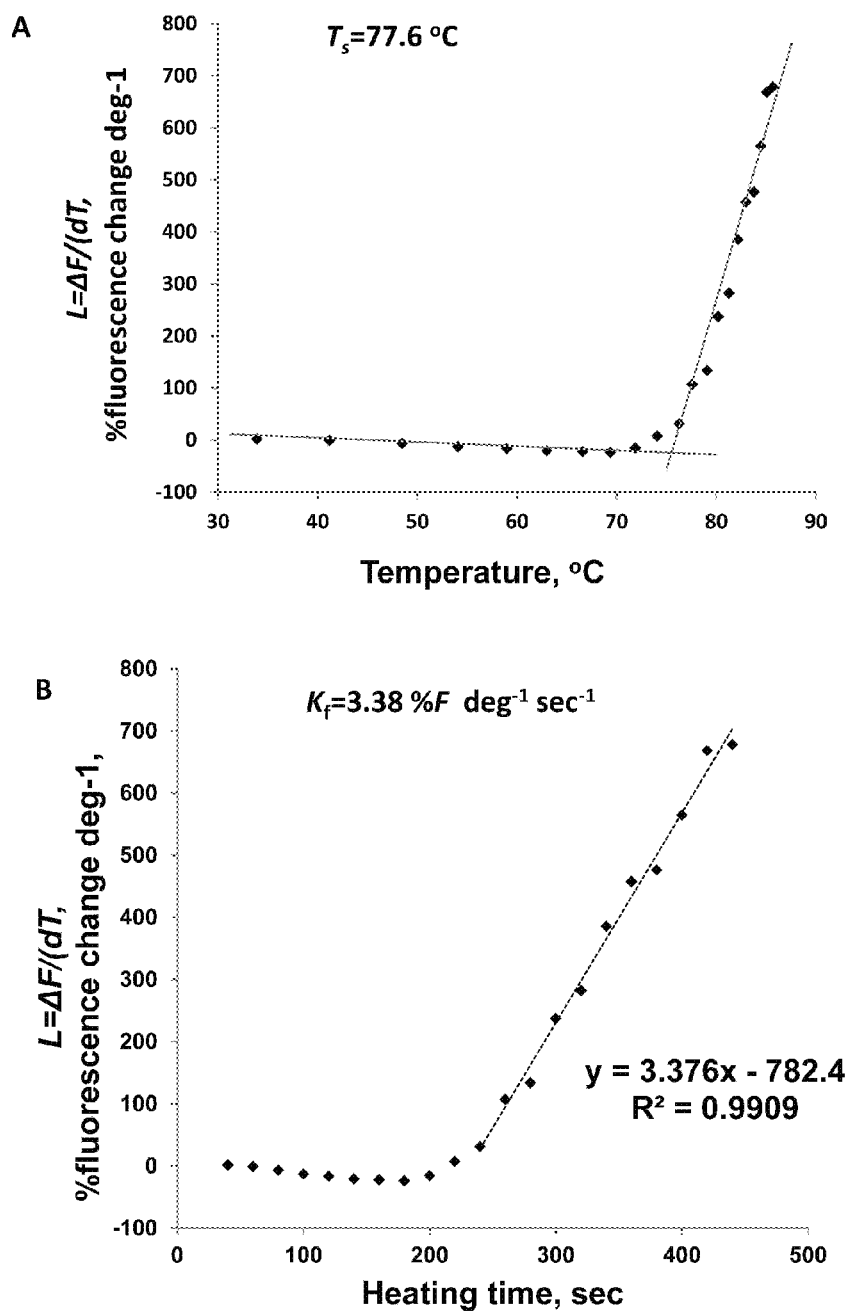
FIG. 18 illustrates temperature response of nanothermometers carrying peptide-dye conjugate 2 A: Measurement of critical temperature sensitivity parameter (Ts=77.6° C., B: rate of fluorescence response ($K_F$=3.38% fluorescence increase/(deg·sec), $R^2$=0.99.

The results demonstrated that, under rapid heating conditions, the nanoparticles become activated between 70° C. and 80° C.—an ideal range for thermal ablation (FIG. 9, FIG. 16, FIG. 17). The fluorescent enhancement after a complete heating-cooling cycle was more than 10 times at 37° C. compare to the initial fluorescence and entirely irreversible. From this data the critical temperature sensitivity was determined to be 77.6° C. (FIG. 18). The control experiment with the dye-peptide conjugate did not reveal such reporting properties. Fluorescence of the free dye-peptide conjugate 2 followed the initial trend similar to the nanoparticle conjugate. The fluorescence intensity was largely suppressed above 55° C. (FIG. 17) and restored back to the original value after the cooling. Such reversible behavior of the free-dye peptide was consistent with the general behavior of fluorophores under reversible thermal conditions. In control experiments with the dye-peptide conjugate, fluorescence of the free dye-peptide conjugate 2 was completely quenched above 55° C. (FIG. 8).

In a clinical setting, nanothermometers must respond quickly to heating, preferably within seconds to avoid overheating of the treatment area. (Gold nanorods carrying peptide—dye conjugate 2 showed a response rate of 3.38% of fluorescence increase/deg$^{-1}$ sec$^{-1}$ at the critical temperature and above (FIG. 18). This value provides a quantitative way of comparing future nanothermometers with improved design. Furthermore, the results shown in FIG. 9 demonstrate that the nanothermometers have an excellent response time, within a few seconds. Their quick response was especially apparent when the switch between the heating and cooling processes occurred (around 420 seconds).

Example 4

This example illustrates a two-fluorophore molecular thermometer.

In these experiments, to construct a molecular thermometer, the inventors conjugated a coumarin to rhodamine 640 which are optically active (absorption and emission) in the visible spectral range (380-650 nm). 7-diethylaminocoumarin-3-carboxylic acid has the following structure:

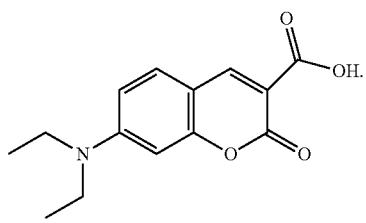

1

Rhodamine 640 has the following structure:

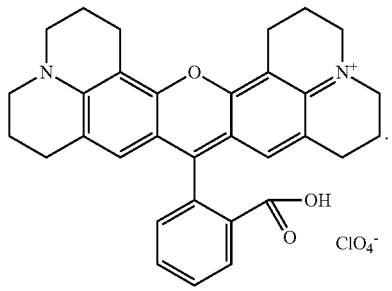

2

These fluorophores are optically active (absorption and emission) in the visible spectral range (380-650 nm).

Materials used for these experiments include the following:

Solvents dimethylsulfoxide (DMSO), dichloromethane (DCM), dimethyl formamide (DMF), and methanol (MeOH) (Fisher, Sigma-Aldrich) were used without purification. 7-diethylaminocoumarin-3-carboxylic acid was prepared as reported 14, rhodamine 640 was purchased from Exciton, N,N-diisopropylethylamine (DIEA), trifluoroacetic acid (TFA) N-hydroxysuccinimide (NHS), N-Boc-ethylenediamine were purchased from Sigma-Aldrich. Coupling reagents 1-ethyl-3-(3-dimethylaminopropyl)carodiimide (EDC), N,N'-dicyclohexylcarbodiimide (DCC) were purchased from Pierce.

Dyes, intermediates, and conjugates were analyzed using HPLC/MS-ESI analysis in the positive mode conducted on a Shimadzu LCMS 2010A equipped with a UV/Vis detector at different wavelengths using a reversed-phase C-18 Vydac column (218TP, 4.6×50 mm) at a flow rate of 0.5 mL/min with a gradient 10-95% acetonitrile in water (both solvents contained 0.1% TFA).

Isolation and purification procedures include the following:

Saturated sodium bicarbonate ($NaHCO_3$) aqueous solution (2 mL) was added to the vial with the synthesized dye and the mixture was vortexed. The two phases were allowed to separate and the aqueous layer was removed. The organic layer was further washed with 2 mL of saturated brine and the brine layer was removed. Combined aqueous solutions were extracted with DCM. Organic layers were combined, dried over sodium sulfate, filtered and the organic solvent was evaporated under reduced pressure using a rotary evaporator. The concentrated compounds were further purified using flash column chromatography on normal phase silica gel with up to 10% MeOH in DCM as eluent. Fractions containing the compounds of interest were combined, solvents were evaporated under reduced pressure yielding the pure compounds (95 area % by HPLC/MS). Reaction mixtures, intermediates, fractions and isolated compounds were analyzed by TLC, HPLC/MS and UV/Vis.

Synthesis methods include the following:

Synthesis of coumarin-ethylenediamine

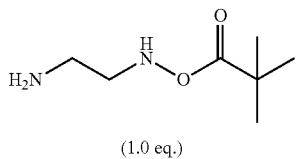

5

NHS (2.0 eq.) was added to a stirred solution of 7-diethylaminocoumarin-3-carboxylic acid 1 in DCM followed by addition of EDC (2.0 eq.). The reaction mixture was left overnight with stirring. The isolated and purified coumarin-NHS ester

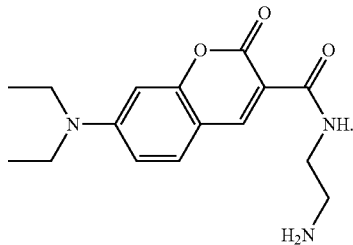

3 was further reacted with N-Boc ethylenediamine

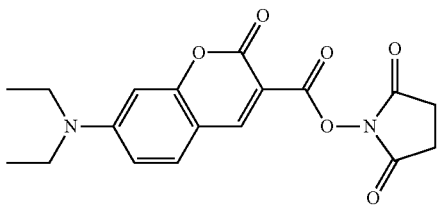

(1.0 eq.)

in DCM in the presence of DIEA (2.0 eq.). The reaction mixture was left with stirring overnight and the course of the reaction was monitored by HPLC/MS. The Boc protected product

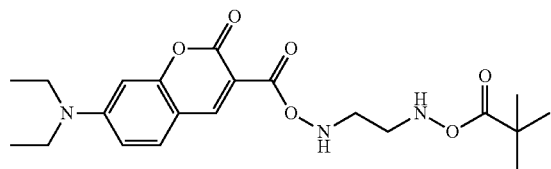

was isolated using an aqueous workup and purified by column chromatography. Deprotection of Boc-group was carried out using a mixture of TFA and DCM (1:1) for 30 min at room temperature to give the product

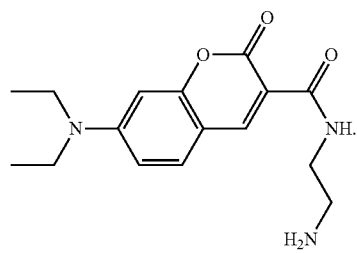

Volatiles from the reaction mixture were evaporated under vacuum using rotary evaporator. Coumarin-ethylenediamine

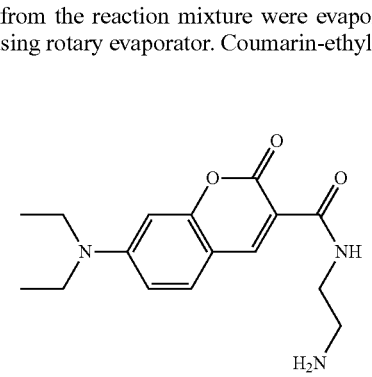

was finally purified by normal phase column chromatography on silica gel (MS-ESI: M+=776).

Scheme 1 for synthesis of coumarin with amino-linker can be summarized as follows. Coumarin

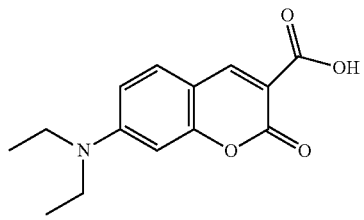

and NHS reacted in the presence of EDC to form an activated compound

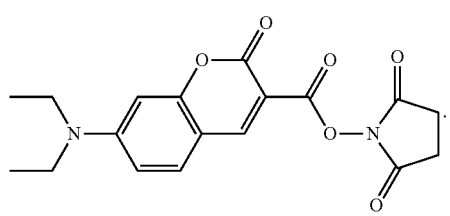

The compound 3 was further reacted with a Boc-protected linker to form

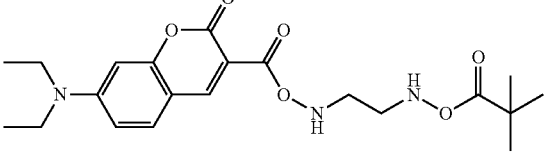

which was deprotected by the TFA/DCM treatment.

Synthesis of Coumarin-Rhodamine Conjugate

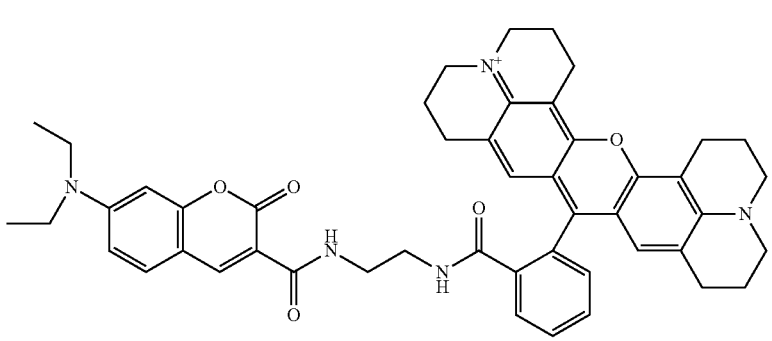

NHS (2.0 eq.) was added to a solution of rhodamine 640 2 in 8 mL of DCM in the presence of 2.0 eq. of EDC to form a rhodamine-NHS ester

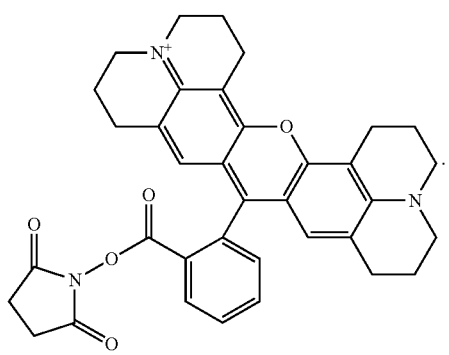

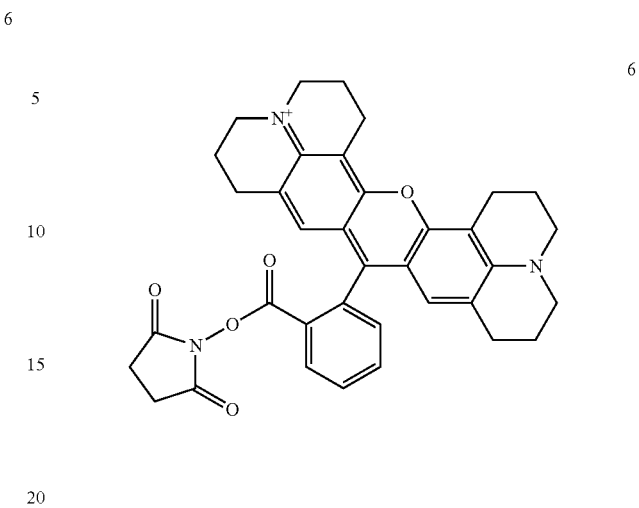

is activated via formation of NHS ester

Figure 20:
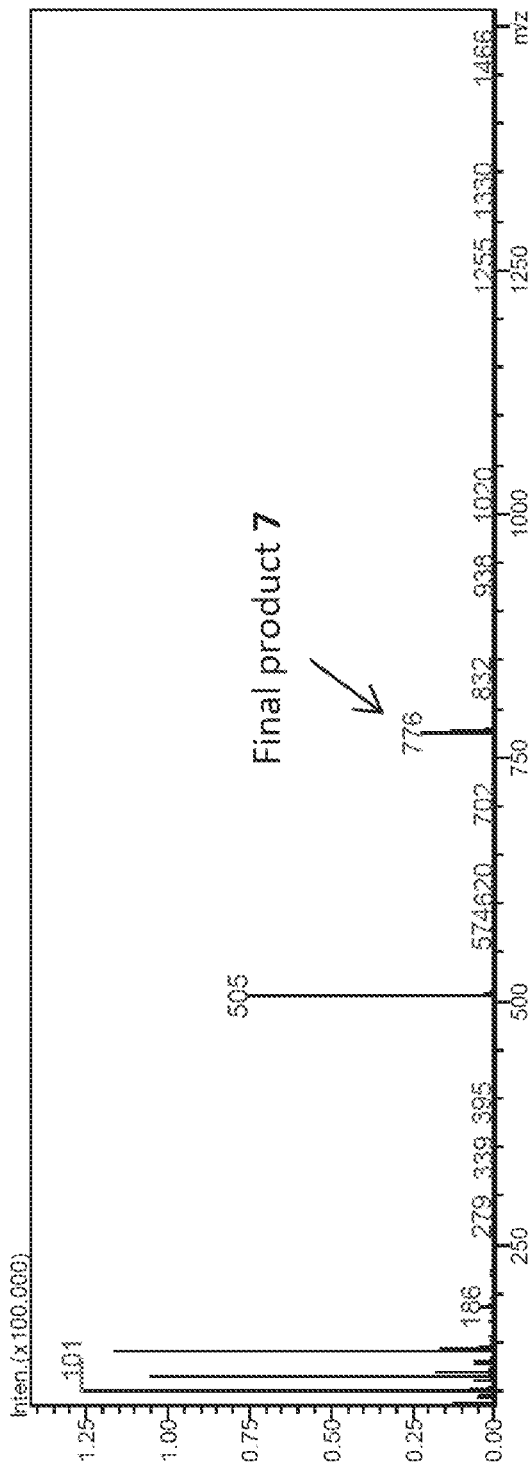
FIG. 20 illustrates an LC/MS readout showing the mass of a coumarin-rhodamine construct 7.

After isolation and purification, rhodamine-NHS ester was reacted with coumarin-ethylenediamine 5 in DCM in the presence of 2.0 eq. of DIEA (Scheme 2). Final product was isolated using an aqueous workup, purified by column chromatography on silica gel, and analyzed by HPLC/MS (see FIG. 20), TLC and spectroscopically.

Scheme 2 for assembly of a coumarin-rhodamine molecular thermometer can be summarized as follows. Rhodamine 640 in DCM in the presence of EDC. The ester 6 is reacted with coumarin-ethylenediamine

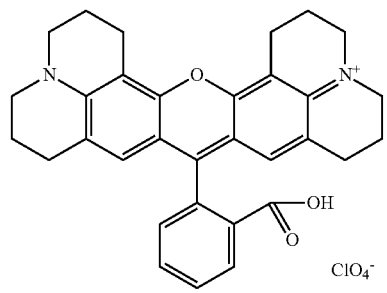

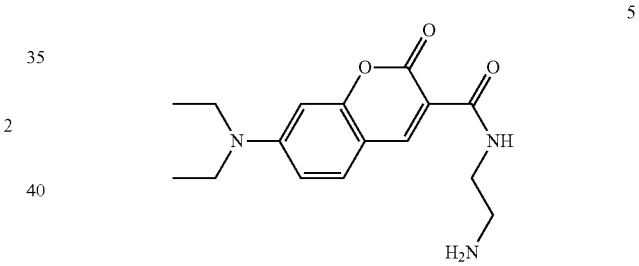

in DCM in the presence of DMAP as a base to form a final construct

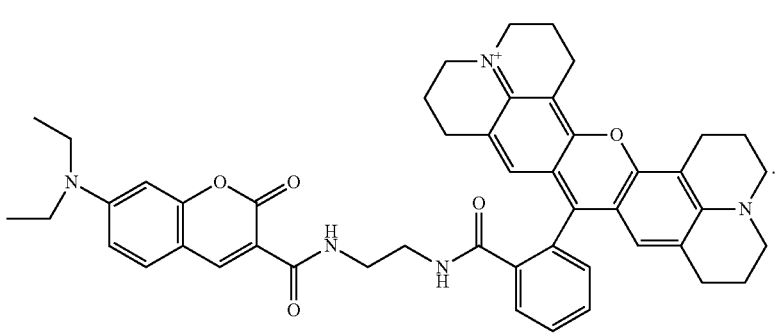

Optical Measurements:

UV/Vis spectra of samples were recorded on Beckman Coulter DU 640 UV-visible spectrophotometer. Steady state fluorescence spectra were recorded on a Fluorolog-3 spectrofluorometer (Horiba JobinYvon, Inc.) and processed using the FluorEssence software. The fluorescence lifetime of the dyes was determined using the time-correlated single photon counting (TCSPC) technique with a NanoLed 430 nm excitation source, as described elsewhere (Berezin, M. Y., et al., Biophysical Journal, 93(8), 2892-2899 (2007)).

Thermal Measurements

In these experiments, coumarin-rhodamine conjugate was dissolved in PBS buffer. Temperature dependent fluorescence was monitored by fluorescence spectrophotometer from 20 to 85° C. and back to 20° C. using temperature controlled Peltier-type cuvette holder (Horiba) with a temperature controller LFI-3551 (Wavelength Electronics) under constant stirring. The temperature was measured in the cuvette using a thermocouple.

Figure 21:
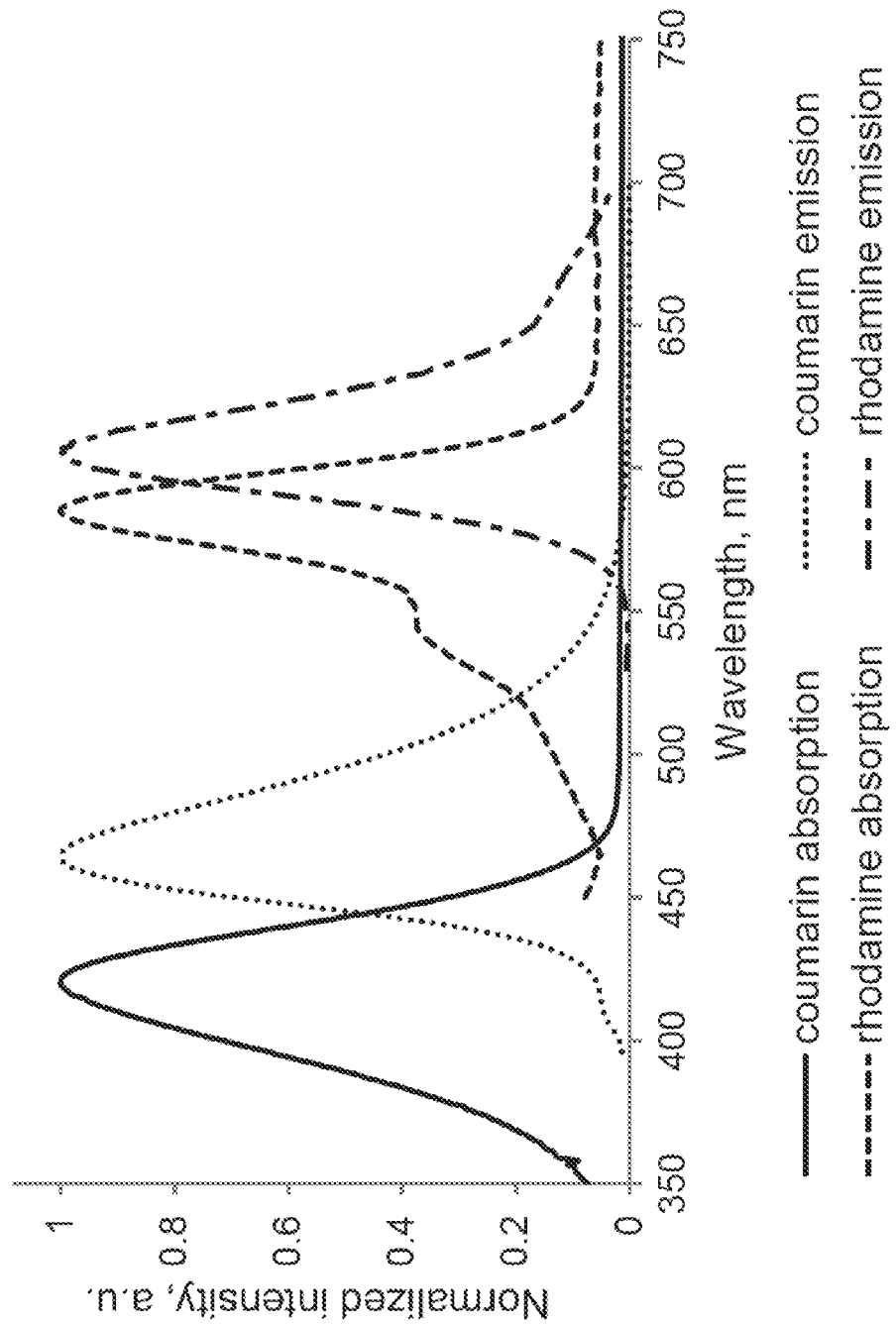
FIG. 21 illustrates normalized absorption and emission spectra of coumarin 1 and rhodamine 640 2.

In this work, we synthesized a novel type of molecular thermometers based on a two fluorophore construct. The two fluorophores forming the molecular thermometers featured non-overlapping absorption/emission spectra (FIG. 3) ensuring the absence of potential energy transfer that could complicate the temperature response. We measured fluorescence of the individual dyes and the conjugate under a range of temperatures from 20 to 85° C. We chose this range to interrogate the sensitivity of the molecular thermometers to clinically relevant temperatures of thermal ablations (Leveillee, R. J., et al., J Endourol, 25(7), 1119-23 (2011); Melancon, M. P., et al., Ace Chem Res, 44(10), 947-56 (2011); Stafford, R. J., et al., Int J Hyperthermia, 27(8), 782-90 (2011)). FIG. 21 illustrates normalized absorption and emission spectra of coumarin 1 and rhodamine 640 2.

Figure 22:
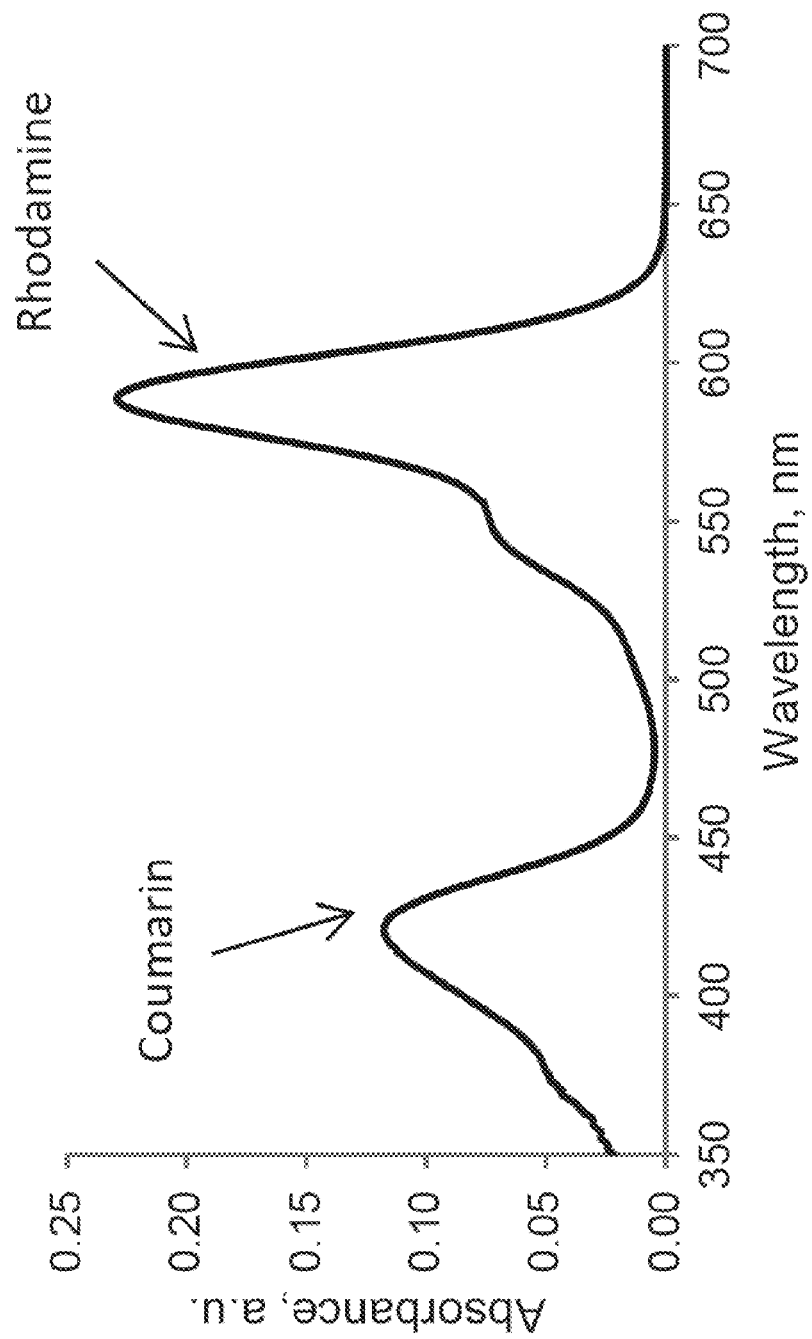
FIG. 22 illustrates UV/Vis absorption spectrum of construct 7 in DMSO.

The UV/Vis spectrum of the conjugate 7 is shown in FIG. 22. The graph displays two peaks with absorption maxima at 420 nm and 580 nm originated from coumarin and rhodamine 640, respectively. The presence of two absorption maxima corresponding to two individual dyes confirms that the construct is composed of two dyes.

Figure 23:
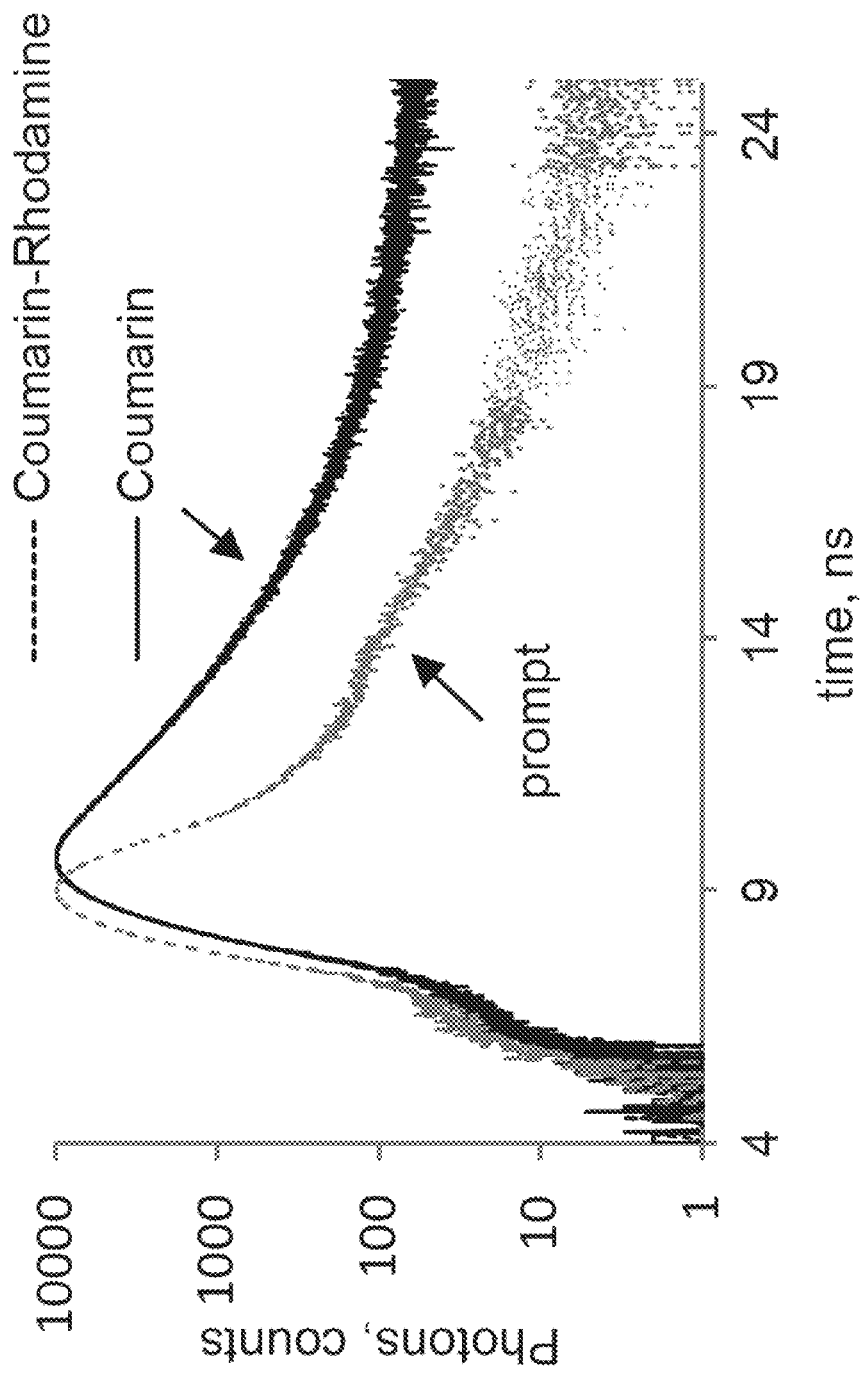
FIG. 23 illustrates fluorescence decays of coumarin 1 and a coumarin-rhodamine construct 7 in DMSO, ex/em 460/i 550 nm.

Due to the small spectral overlap, no energy transfer was observed using fluorescence lifetime measurements of the donor. Fluorescence lifetime measurements of both coumarin alone and coumarin-rhodamine construct revealed identical decay curves with similar values of average lifetime 1.23 and 1.25 ns, respectively, indicating the absence of energy transfer from the donor (coumarin) to the acceptor (rhodamine) in the construct 7 (FIG. 23, Table 1).

TABLE 1

Fluorescence lifetime values of coumarin 1 and coumarin-rhodamine construct 7 in DMSO.

| Sample | $\tau_1$, ns | $\tau_2$, ns | $f_1$, % | $f_2$, % | $\tau_m$, ns | $\chi^2$ |
|---|---|---|---|---|---|---|
| Coumarin (1) | 0.93 | 1.65 | 53.47 | 37.93 | 1.23 | 1.06 |
| Coumarin-rhodamine (7) | 1.04 | 2.08 | 73.6 | 18.37 | 1.25 | 1.12 |

For temperature sensitivity we, first, measured temperature dependent fluorescence intensities of coumarin 1 and

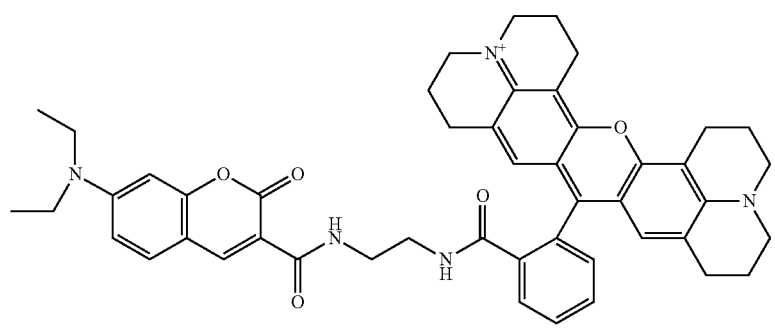

Figure 24:
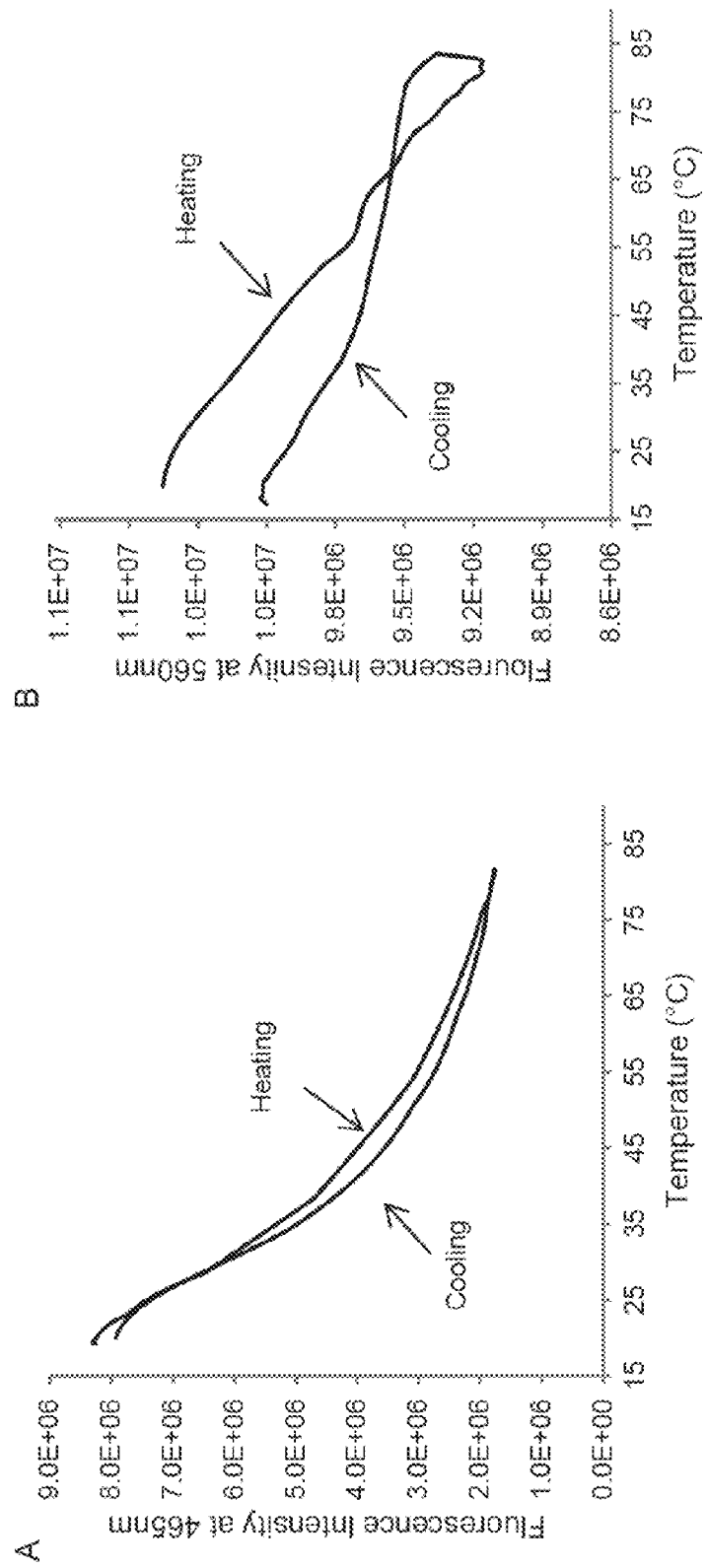
FIG. 24 illustrates temperature-dependent emission. 24A: coumarin 1 in PBS measured ex/em 415/465 nm. 24B: rhodamine 640, ex/em 510/560 nm. 24C: a ratiometric dependence of rhodamine to coumarin emission intensity as a function of temperature.
Figure 24:
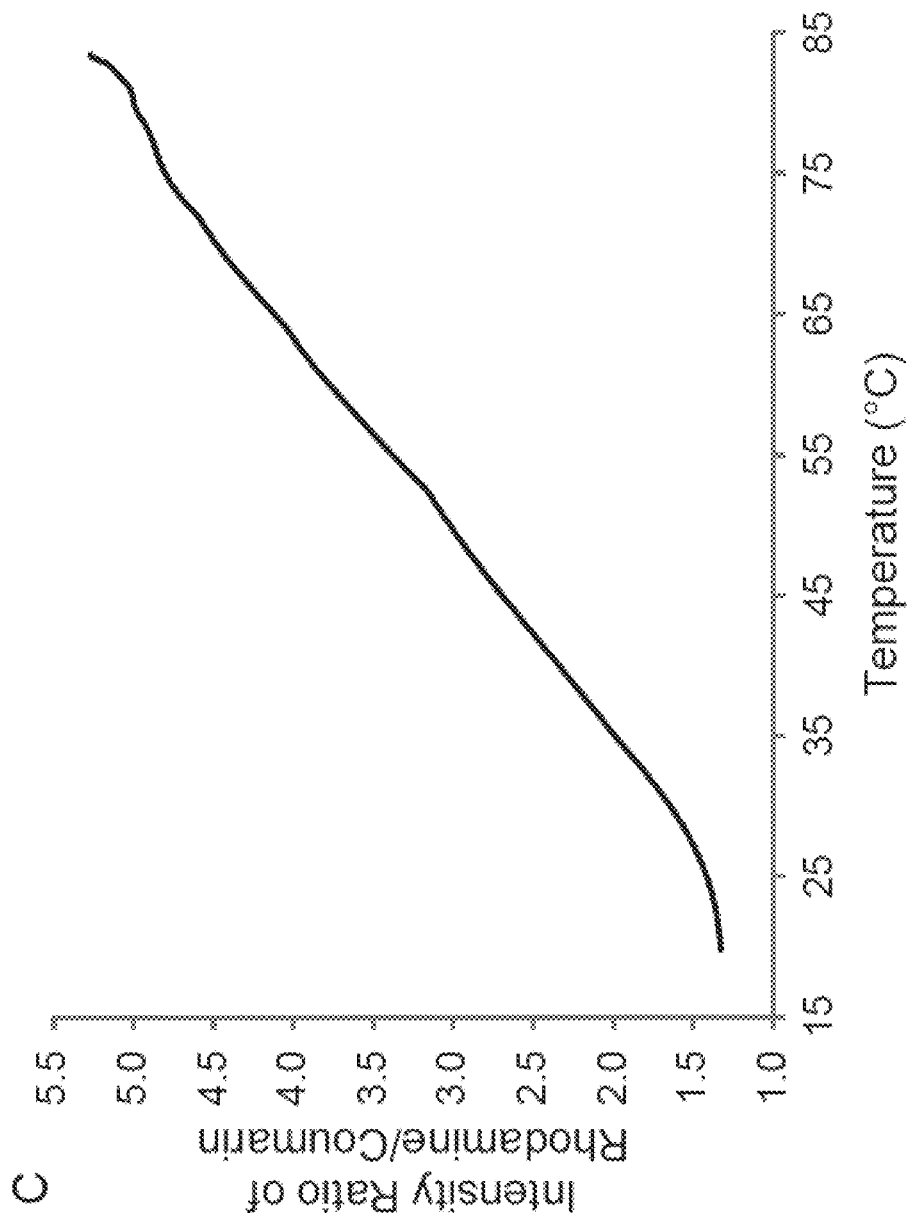

7 rhodamine 640 2 individually in a PBS buffer. Based on the dyes' absorption spectra, the studies were conducted at two channels 415/465 nm and 510/560 nm for coumarin and rhodamine respectively in the temperature range from 20 to 85° C. Coumarin showed 4 times decrease in fluorescence intensity when heated from 20 to 85° C., while rhodamine's signal remained almost unchanged (FIG. 24 A, B).

Since signal from rhodamine didn't significantly change with time, we conducted a ratiometric analysis according to the equation below, using rhodamine's fluorescence as a reference and coumarin's fluorescence as a sensor. This method yielded a graph (FIG. 24C) showing a 4.1 time change in the fluorescence when fluorophores are heated from 20 to 85° C.

$$\frac{1}{\text{Ratio}} = \left[\frac{F_{rho}}{F_{cou}}\right]^{-1} = \left[\frac{F_{510/560}}{F_{415/465}}\right]^{-1}$$

Where $F_{415/465}$ is the emission of the construct at the ex/em 415/465 nm, $F_{510/560}$ is the emission of the construct at ex/em 510/560 nm.

Figure 25:
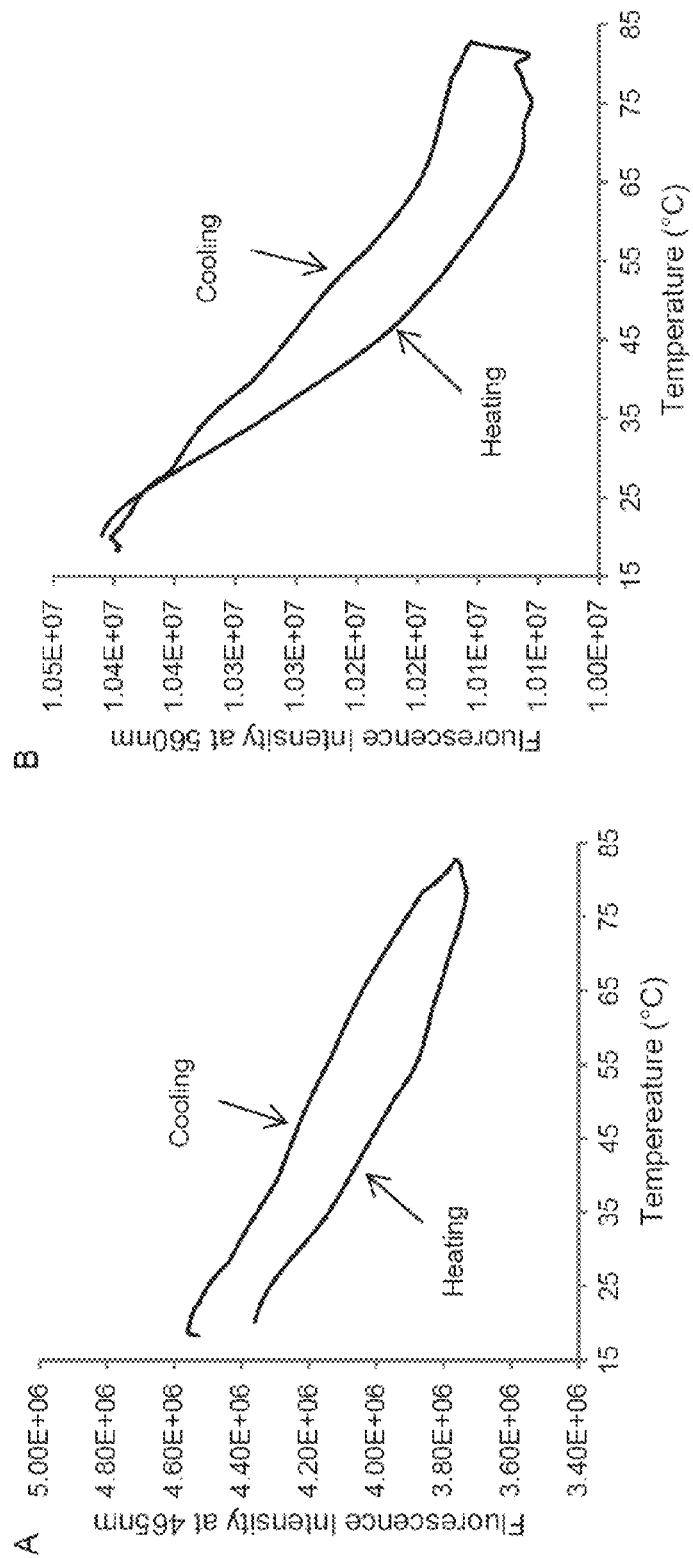
FIG. 25 illustrates temperature-dependent emission. 25A: coumarin part of a construct 7 in PBS measured ex/em 415/465 nm. 25B: rhodamine part of a construct 7, ex/em 510/560 nm. 25C: a ratiometric dependence of a construct 7 emission intensity as a function of temperature.
Figure 25:
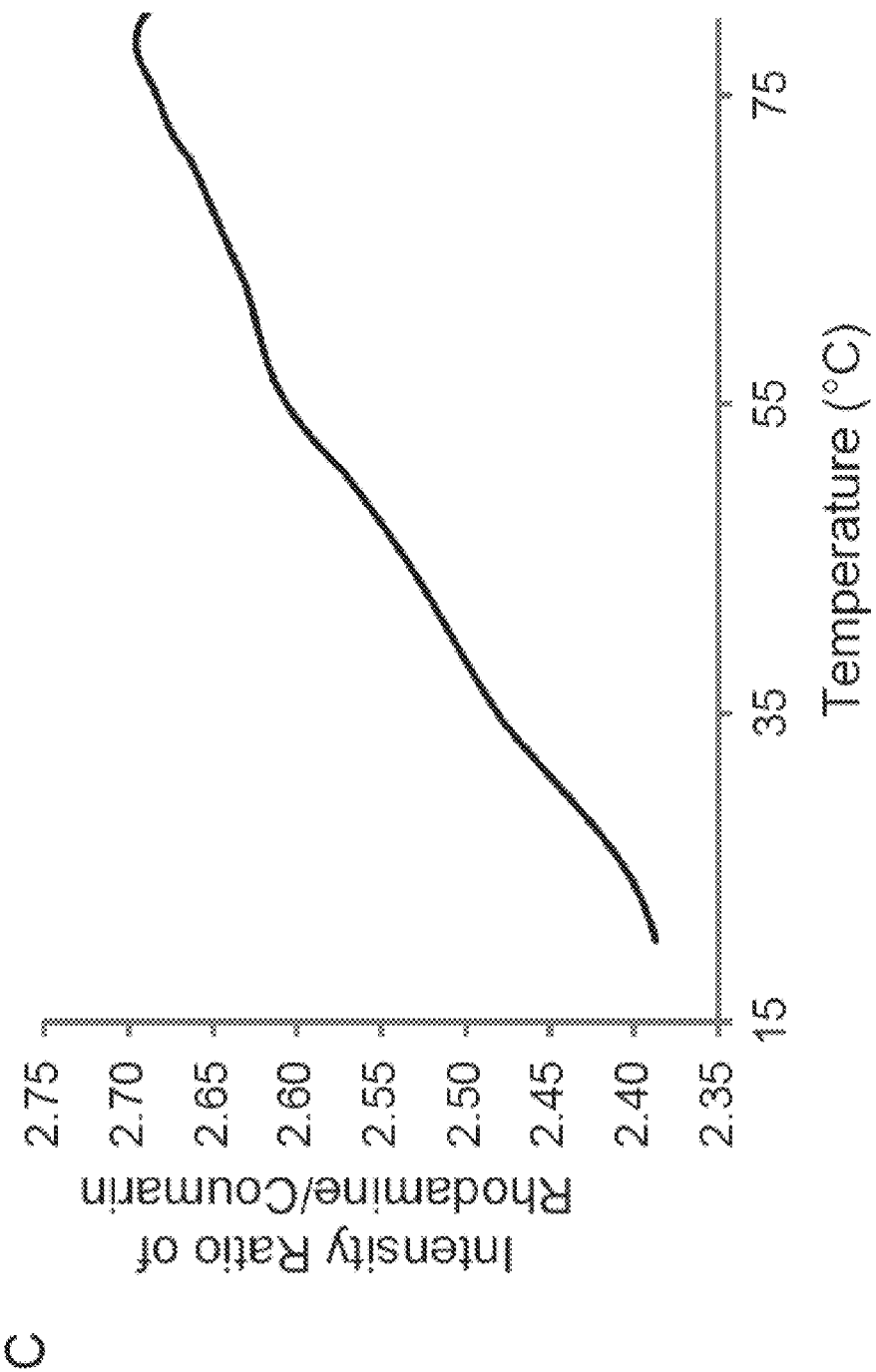

Encouraged by the successful results with individual dyes, we applied the synthesized the construct 7. Two fluorophores covalently linked together retain their 1 to 1 ratio oppose to the physical mixture of the two dyes and thus expected to be intact upon administration during thermal ablation procedures. We analyzed the thermal sensitivity of the construct using two channels 415/465 nm and 510/560 nm. The temperature dependent fluorescence of such construct 7 is shown in FIG. 25. As expected, the emission of the rhodamine part remained stable upon heating and subsequent cooling (FIG. 25A). In contrast, the emission signal corresponding to coumarin decreased as temperature raised (FIG. 25B). Since rhodamine's emission was not dependent on the temperature, we used this part of the spectra as a reference point in the temperature measurement. More sensitive to temperature coumarin's emission was utilized as a sensor.

The result of ratiometric analysis of the conjugate 7 is shown in FIG. 7C. Importantly, the construct showed high reversibility and linearity after the heating-cooling cycle, indicating its stability under thermal stress. The data points were generated by dividing the emission intensity of the sensor (coumarin) to the reference (rhodamine 640) of the construct. We used the reverse of the ratio to take the decrease in fluorescence intensity into account.

$$\text{Ratio} = \left[\frac{F_{rho}}{F_{cou}}\right] = \left[\frac{F_{510/560}}{F_{415/465}}\right]$$

Where $F_{415/465}$ is the emission of the construct at the ex/em 415/465 nm corresponding to coumarin, $F_{510/560}$ is the emission of the construct at ex/em 510/560 nm corresponding to rhodamine.

Comparison of the FIG. 24C and FIG. 25C indicate that while the construct 7 still remains sensitive to the temperature change, its sensitivity lowered significantly compare to the free dyes. Although the molecular thermometer 7 lost some of its sensitivity, it remains linear in the thermal ablation relevant temperature range and is reversible.

All references cited herein are hereby incorporated by reference, each in its entirety.

What is claimed is:

1. A nanothermometer comprising:
   a nanoparticle;
   a self-quenching fluorophore; and
   a linker extending between the nanoparticle and the fluorophore wherein the linker is a peptide consisting of a sequence selected from the group consisting of NH$_2$-Gly-Cys-Cys-Gly-NH$_2$ (SEQ ID NO: 1), and NH$_2$-Gly-Cys-Cys-Gly (SEQ ID NO:2).

2. A nanothermometer in accordance with claim 1, wherein the nanoparticle is a gold nanoparticle.

3. A nanothermometer in accordance with claim 1, wherein the fluorophore is 7-diethylaminocoumarin-3-carboxylic acid.

4. A nanothermometer comprising:
   a nanoparticle;
   a fluorophore;
   a first linker extending between the nanoparticle and the fluorophore, wherein the first linker is a peptide consisting of a sequence selected from the group consisting of NH$_2$-Gly-Cys-Cys-Gly-NH$_2$ (SEQ ID NO:1), and NH$_2$-Gly-Cys-Cys-Gly (SEQ ID NO:2); and
   a fluorescence quencher.

5. A nanothermometer in accordance with claim 4, further comprising a second linker extending between the nanoparticle and the fluorescence quencher.

6. A nanothermometer in accordance with claim 4, wherein the nanoparticle is a gold nanoparticle.

7. A nanothermometer in accordance with claim 4, wherein the fluorophore is 7-diethylaminocoumarin-3-carboxylic acid.

8. A nanothermometer in accordance with claim 5, wherein the second linker is a peptide selected from the group consisting of NH$_2$-Gly-Cys-Cys-Gly-NH$_2$ (SEQ ID NO:1), and NH$_2$-Gly-Cys-Cys-Gly (SEQ ID NO:2).

9. A method of measuring temperature of a sample, comprising:

SEQUENCE LISTING

```
<160> NUMBER OF SEQ ID NOS: 2

<210> SEQ ID NO 1
<211> LENGTH: 4
<212> TYPE: PRT
<213> ORGANISM: Artificial Sequence
<220> FEATURE:
<223> OTHER INFORMATION: Synthesized sequence, Carboxy-terminal
      amidation

<400> SEQUENCE: 1

Gly Cys Cys Gly
1

<210> SEQ ID NO 2
<211> LENGTH: 4
<212> TYPE: PRT
<213> ORGANISM: Artificial Sequence
<220> FEATURE:
<223> OTHER INFORMATION: Synthesized sequence

<400> SEQUENCE: 2

Gly Cys Cys Gly
1
``` contacting the sample with a nanothermometer of claim 1; and measuring fluorescence of the nanothermometer, whereby fluorescence intensity is indicative of temperature.

* * * * *

UNITED STATES PATENT AND TRADEMARK OFFICE
CERTIFICATE OF CORRECTION

| | |
|---|---|
| PATENT NO. | : 9,274,008 B2 |
| APPLICATION NO. | : 14/091948 |
| DATED | : March 1, 2016 |
| INVENTOR(S) | : Mikhail Y. Berezin and Tiffany P. Gustafson |

It is certified that error appears in the above-identified patent and that said Letters Patent is hereby corrected as shown below:

In the Specification

Column 1, Lines 11-13 should read: This invention was made with government support under CA149814 awarded by the National Institutes of Health. The government has certain rights in the invention.

Signed and Sealed this
Nineteenth Day of July, 2016

Michelle K. Lee
*Director of the United States Patent and Trademark Office*